(12) United States Patent
Huang

(10) Patent No.: US 10,354,479 B2
(45) Date of Patent: Jul. 16, 2019

(54) SYSTEM FOR AUTOMATICALLY COOKING AND SELLING FROZEN FOOD

(71) Applicant: ZiSheng Huang, ShenZhen (CN)

(72) Inventor: ZiSheng Huang, ShenZhen (CN)

(*) Notice: Subject to any disclaimer, the term of this patent is extended or adjusted under 35 U.S.C. 154(b) by 77 days.

(21) Appl. No.: 14/903,054

(22) PCT Filed: Apr. 3, 2014

(86) PCT No.: PCT/CN2014/074701
§ 371 (c)(1),
(2) Date: Jan. 5, 2016

(87) PCT Pub. No.: WO2015/018204
PCT Pub. Date: Feb. 12, 2015

(65) Prior Publication Data
US 2016/0335833 A1 Nov. 17, 2016

(30) Foreign Application Priority Data

Aug. 5, 2013 (CN) .......................... 2013 1 0351280
Mar. 11, 2014 (CN) .......................... 2014 1 0087705

(51) Int. Cl.
G07F 17/00 (2006.01)
A47J 39/00 (2006.01)

(52) U.S. Cl.
CPC ........ G07F 17/0078 (2013.01); A47J 39/003 (2013.01)

(58) Field of Classification Search
CPC .......... A47J 39/003; A47J 31/22; A47J 31/407
USPC .......... 99/280, 283, 295, 300, 305, 307, 532
See application file for complete search history.

(56) References Cited

U.S. PATENT DOCUMENTS

| 3,425,339 A | 2/1969 | Fleischman et al. |
| 5,147,994 A | 9/1992 | Smith |
| 6,142,063 A * | 11/2000 | Beaulieu ................. A47J 31/32 99/283 |
| 717,483 A1 | 2/2007 | Dong |
| 2010/0239734 A1* | 9/2010 | Yoakim .................... A47J 31/22 426/433 |

FOREIGN PATENT DOCUMENTS

| CN | 2922708 | * | 7/2007 | ............. A47B 31/02 |
| CN | 2922708 Y | | 7/2007 | |
| CN | 101856059 A | | 10/2010 | |
| CN | 102426723 A | | 4/2012 | |
| CN | 102637321 A | | 8/2012 | |
| CN | 202404679 U | | 8/2012 | |
| JP | H9-134476 A | | 5/1997 | |
| JP | 2002078454 A | | 3/2002 | |
| WO | PCT/KR2003 B1 | | 12/2003 | |
| WO | PCT/NZ2005/000099 A1 | | 11/2005 | |
| WO | PCT/AU2008/000759 A1 | | 12/2008 | |

* cited by examiner

Primary Examiner — Phuong T Nguyen

(57) ABSTRACT

A food-automatic-cook-and-processing system, which may be used in the automatic-cooking-and-processing vending system; a series of auto piercing food-processing devices have tunnel(s) to pierce the disposable food container(s) in the devices, heat the hot air inside and adjust the temperature, make it circulating and past the food in the food containers, finally cook the food.

10 Claims, 7 Drawing Sheets

SYSTEM FOR AUTOMATICALLY COOKING AND SELLING FROZEN FOOD

FIELD OF THE INVENTION

This invention generally relates to integrated fully automatic CNC equipment for quick-frozen/frozen foods, which comes in low temperature compatibility design, and supports comprehensive processing operations (refrigeration, moving, opening, mixing, cooking, heating, displaying and sale etc.) simultaneously for multiple quick-frozen/frozen foods and their containers.

DESCRIPTION OF PRIOR ART

I. Currently, the known cooked food vending machine in the prior art, its working pattern is that:
Or, the customer needs to take out the sold pre-packed food, and manually heats or cooks the food, or directly eats the food without cooking.
  This type of vending machine is similar to generic vending machine or drop-out vending machine: when food such as the instant cup noodle drops down to the fetch opening, the customer takes out the cup noodle, tears open the packing, and places it into the water heater or microwave oven, manually inject hot water or heat them up. Or foods like ice cream do not need cooking.
Or, the vending machine has only simple warm keeping and fetch functions, cannot preserve food for long time.
  This type of vending device is similar to electronic storage box in superstores, when the customer pays, the corresponding gate of the box will be opened for the customer to take out the food. This type of device comes in large size with poor space utilization rate and without devices such as refrigeration, water heater and microwave oven.
Or they adopt complicated and high-cost mechanism, boxes, only have simple warm keeping and heating.
  This type of vending device adopts complicated and high cost mechanical construction to solve the problem of selling multiple varieties of foods. For example, each kind of food is respectively placed into corresponding storage box; each box is provided with electrically controlled gate & window; varieties of foods are taken out through complicated mechanisms such as screw push, pallet, hinge and conveyor belt, and then process the foods with microwave heating etc.
Or, the foods provided come in limited types. Tasty, nutritious formal meal food cannot be provided, and its is not sanitary enough either.
  This type of vending machine adopts fixed food processing process and design, like factory production line. The food is processed in a small production line, only small size food of particular shape (such as beef ball and thin cake) can be processed, the food generally is not packed, and this device is hard to be clean.
On the whole, the above described cooked food vending machine are hard to be commercially promoted due to simple functions, complicated operation, time consumption, complex construction, high cost and being unsanitary.

II. Quick-freeze and refrigeration are effective ways for keeping foods including carbohydrate food, meat and green vegetables. Quick-frozen food generally needs to be kept below −18° C. Quick-frozen foods are primarily sold in superstores, which are to be processed by the customer after purchase before eating. Quick frozen foods are generally kept in the open ice boxes (or provided with double-glazed window) of superstores. After taking home by the customer, they can be stored in the ice chamber of the refrigerator. Before eating, they shall be heated by processing devices such as microwave oven. However, there will be various problems when these refrigeration devices are applied in the vending machine.

Though the household refrigerator has excellent refrigeration performance, this simple structure with simple function is hardly possible to be directly applied to vending machine. Because the quick frozen food generally needs to be stored below −18° C., when taking food from or placing food to the ice chamber of the household refrigerator, the gate of the ice chamber needs to be opened. The area of the gate is very large, and when a lot of foods need to be taken or placed, the gate needs to be open for quite a long time. During this process, a thick layer of ice will come into being inside the ice chamber, resulting in malfunction of the internal device due to condensation of the external humid hot air in the ice chamber. For food vending machine, high temperature vapor will be generated when cooking and processing the food, humid hot air will also be formed in the vending machine due to air exchange. Exchange between cold dry air and hot humid air will surely compromise refrigeration performance and result in food going bad, further resulting in frost condensation, compromising the operating performance, stability, service life of the mechanical devices, increasing maintenance work. Food sales generally concentrate at a certain periods of a day, therefore, this problem become more serious to vending machines.

The commercial open ice boxes in superstores is designed for the big sales volume in superstores. Maintenance personnel are provided in superstores for frequent maintenance and frost removing etc. Due to non-fully-enclosed construction, its energy utilization efficiency is low and the power consumption is high. However, since the sales volume of the quick-frozen or cold stored foods in superstores is huge, the power consumption can be ignored to a certain extent. But the vending machine is automatic and shall be maintenance-free. And the sale volume is not as big as in superstores, therefore, power saving is required.

Similarly, the refrigeration house or its air cooler etc. all require maintenance personnel and manual operation.

III. In the prior art, the complicated optical-mechanical-electrical-integrated object-moving system, the multi-axis mechanical manipulator with optical sensor which is able to catch object and dynamically adjust its gesture according to the feed-back information by the sensor, is applied in some fields of high-tech automatic production line, CNC machine and SMT machine, etc.

Some vending machines are provided with small, relative simple mechanical pallet manipulator, suction manipulator, clamping manipulator and push manipulator etc. These mechanical manipulator systems have limited functions and doesn't need to, according to the feed-back information, dynamically adjust parameters such as position etc., instead operate according to the programmed fixed track only.

However, the food containers generally come in single layer, particular shape and relatively soft material, it cannot be under force, and its cover is easy to open; liquid is generally contained, it requires level placement when clamping held. Generally, the volume and mass of the meal and its container is large, requiring long travel distance for the mechanical device, and the longer travel distance requires for higher speed of the mechanical device. And the food generally requires multi-step processing, so the mechanical manipulator has to shuttle and move the food, resulting in higher requirement on the moving speed of the mechanical device. These structures of this pallet manipulator, suction manipulator, clamping manipulator and push manipulator are not designed for these purposes, and cannot satisfy these requirements.

Beneficial Effects

In order to overcome the limitation of the existing cooked-food vending machine for popularization and application, this invention revolutionarily created a smart fully-automatic equipment that integrated food preservation, cooking and vending. The beneficial effect of the invention is that: a novel method of preservation, sale, mixing and cooking, can quickly supply most kind of ordinary foods and can effectively ensure the high quality and the sanitary safety of the sold foods. This invention has powerful functions, have advantage in the cost of manufacturing, so it has great commercial potential. Especially, compare to manual operation it has an notable cost advantage.

Specifically, comparing to the existing vending machine with the function of food processing, this invention

- Greatly simplifies the structures of the boxes and the product shelves, greatly reduces the area of the auto doors.
- Greatly simplifies the complexity of the mechanical system through the use of CNC equipment, and because the mechanical structure is simple and reliable, it is easy in maintenance.
- Achieved automatic food processing for a wide range of varieties of foods in various forms.
- The whole process of food processing, is in either freezing or high temperature, it is nonviable to germs, more sanitary, and make the food better quality.
- The equipment got no influence from soot, maintenance free in long term for food processing, food for long time free of maintenance, and really make it come true for unmanned cooking.

As a result, the commercial prospect of this invention is far better than the existing systems, it is a great reformation in the current industry of the sale and processing of foods.

SUMMARY OF THE INVENTION

Briefly, this invention, i.e. the vending machine, the devices inside (comprising hot processing devices and devices exchanging hot air with the outside) adopt embedded structure, and are arranged inside the low temperature ice chamber. The outgoing and incoming food products are completely through small windows handled by fetching devices such as mechanical manipulator. This structure effectively reduces the area that exchange with the external air and the area that use non-insulation materials, moreover, it simplifies the structure, reduce the area and number of auto gates and windows, greatly reduced the manufacturing cost. Through the control of the air flow path and the use of thermal evaporation components on the key mechanical parts, this invention make the devices which inside the low temperature ice chamber not affected by from the humidity and the frost, and work normally, meanwhile, it reduce the maintenance cost and increase service lifetime. To satisfy the above mentioned food in-out, handling and processing requirements, this invention also designs suitable mechanical manipulator device, product shelves and food container. This invention also provides various food processing devices and methods correspondingly.

Specifically:

[The Section for the Whole Structure]

This invention provide an automatic-cooking-and-processing vending system for frozen-food, comprising:
the low-temperature chamber, the object-moving system, the product shelves, the low-temperature chamber equipment, the food container;
the storing temperature of the foods in the said low-temperature chamber is lower than the freezing temperature of the foods;
the said low-temperature chamber equipment is inside the low-temperature chamber, or connected to the casing of the low-temperature chamber;
the low-temperature chamber equipment contains hot-air source and the humid-air source;
the said food container is on the product shelves;
the said food container is disposable food container;
the said product shelves is inside the low-temperature chamber;
the object-moving system is inside the low-temperature chamber, and able to move the food container.

This invention also provided: there is the air-circulating system;
the said air-circulating system has inlet passage(s) for the external air, and inside the passage(s) there is the cold chamber, and the hot-and-humid air that flows from the outside here goes in, and after the hot-and-humid air goes through this passage, it is converted to dry-and-cold air, and the residual ice and frost is condensed inside the cold chamber, and will be melted and discharged inside the cold chamber;
the said air-circulating system has the air-pressure device, which makes that the dry-and-cold air produced by the cold chamber enter the low-temperature chamber, and also causes the interior of the low-temperature chamber to have a pressure higher than the outside, so that the internal dry-and-cold air will flow outwards or get discharged, and the external hot-and-humid air is forced to be isolated.

This invention also provided: the refrigerating system of the air-circulating system has the dynamic-adjusting structure, which can continually conduct operations of refrigeration and frost-removing;
the said dynamic-adjusting structure have two independent cold chambers;
the two cold chambers are connected in series, the air goes through the two cold chambers above successively;
having the dynamic-adjust-routing valves and passages, which can adjust the priority sequence for passing through the cold chambers of the air.

This invention also provided: the said air-circulating system has the air-discharging device, which is inside the said low-temperature chamber equipment, the dry-and-cold air in the low-temperature chamber is discharged via the valves or passages of the air-discharging device.

This invention also provided: inside the low-temperature chamber equipment, there is at least one customer-fetching equipment;
inside the customer-fetching equipment there is the sensor, which can identify whether the food container is existing or not, moving in or out;
the customer-fetching equipment has the auto gate;
the object-moving system picks up or put down the food container inside the said customer-fetching equipment;
the food container goes in or goes out of the low-temperature chamber via the said customer-fetching equipment.

This invention also provided: the said customer-fetching equipment has recognition device, which can recognize the label on the food container or the type of the food container.

This invention also provided: having the thermal-evaporation-frost-removing system, and the thermal-evaporationfrost-removing system has the heating wires to heat the mechanical parts for a short period for evaporation to remove the frost,
and the heating wires of the thermal-evaporation-frost-removing system are in the interior, or on the casing of the mechanical parts.

This invention also provided: The said object-moving system has a form of exploring into the product shelves or the low-temperature chamber equipment;
the said product shelves and the said low-temperature equipment are open to the object-moving system;
the moving range of object-pick-up section of the said object-moving system matches the storing range of the food containers;
the left-right movement mechanism is based on the up-down movement mechanism;
the up-down movement mechanism can have balance-weight devices at the both sides;
the up-down movement mechanism can have synchronous devices at the both sides;
the object-moving system can have a axis-rotation mechanism, and the axis-rotation mechanism is vertical;
both the axis-rotation mechanism and the forth-back movement mechanism are based on the left-right movement mechanism;
the forth-back movement mechanism has at least one level of retractable structure.

This invention also provided: Having the optical system, which moves along with the object-moving system; and the optical system has multiple infrared sensors.

This invention also provided: having the pit-groove plate, which is used on the product shelves to limit the food container, so that it can not make unexpected movement;
and there is at least one level of pit and groove on the pit-groove plate, matching at least one size of the food container.

This invention also provided: the said object-moving system has a form of pincers manipulator,
And the pincers manipulator has up-and-down opening-closing pincers to catch the turnup of the food container,
and the pincers manipulator has a chamfer against & to support the lower part of the food container,
and the optical system comprises a forward sensor and a turnup sensor.

This invention also provided: the said object-moving system has a form of hook-push manipulator, comprising the hook-push manipulator, the retractable pallet, and the ridgy shelf board;
the hook-push manipulator has a ring, which pushes and pulls the food container forth and back, left and right,
and the retractable pallet is retractable, and the retractable pallet is a shovel to hold up the food container,
and the ridgy shelf board is located on the product shelves, and it has guiding and spacing ridges,
and the optical system comprises at least a forward sensor.

This invention also provided: the said object-moving system has a form of the drawer-like storing-and-transporting receptacle, comprising the pickup device, the the pickup device, the drawer-like storing-and-transporting receptacle, the small food container, and the hook-fork manipulator;
and the drawer-like storing-and-transporting receptacle is movable, and the drawer-like storing-and-transporting receptacle is on the product shelves, and the drawer-like storing-and-transporting receptacle has a handle;
and the small food containers are arranged as array and stacked up inside the drawer-like storing-and-transporting receptacle;
and the hook-fork manipulator has the hook-fork that inserts into the handle of the drawer-like storing-and-transporting receptacle, and the hook-fork manipulator has a push-pull ring and plain shovel;
and both the pickup device and the optical system are fixed structures, and the optical system is in the same direction as the pickup device;
and the pickup device has a fixed long stem, and the pickup device explores inside the drawer-like storing-and-transporting receptacle to pick up the small food container.

This invention also provided: the IR sensors of the optical system has a left-right-symmetrical & slant layout, comprising at least comprising at least two opposite slant-forward sensors.

This invention also provided: the IR sensors of the optical system can be in an asymmetrical forward-and-sideward layout,
comprising at least a forward sensor and a sideward sensor.

[The Section for the Cook-and-Processing Equipments]

This invention provide a food-automatic-cook-and-processing system, comprising:
Object-moving system, food-processing equipment, food container;
The said food-processing equipment has the piercing food-processing device;
The said piercing food-processing equipment has one or more tunnel, the end of which has sharp structures that can pierce the food container;
The said food container is disposable food container, which has a fixed shape and can support piercing operation;
The said object-moving system has structures for moving the food container;
wherein, the structure that makes the above tunnel pierce or exit the inner chamber of the food container, is provided.

This invention also provided: the said piercing food-processing equipment has adjusting device, which can adjust the volume, velocity or temperature of the media going through the said tunnel.

This invention also provided: the said adjusting device has hot-air-circulating-and-heating mechanism,
The hot-air-circulating-and-heating mechanism can, through the air tunnels, blow in and suck out the hot air from the inner chamber of the food container,
and cause the hot air to flow through closed loop inside the air tunnels and the food container, heating the food inside the food container by circulating hot air.

This invention also provided: the said adjusting device has valves and air passages connected to the external air;
When the above valves are opened, the hot air inside the food container is discharged, and the external cold air goes inside the food container, cooling down the food.

This invention also provided: The said hot-air-circulating-and-heating mechanism has a heat-storing device, and the air passage of the heat-storing device have valves, which can adjust the velocity or flow of the hot air going through the heat-storing device.

This invention also provided: Have piercing powder-conveying-allocating structures,
which can simultaneously pierce the to-be-processed food container and another as-food-material-source food container,
and establish airflow passage between the two inner chambers in the above food containers;
Create and utilize the high-speed circulating airflow to suck the powder food material inside the food container, which serve as the source of food material;

After going through gas-solid separating equipment, release the powder into the to-be-processed food container.

This invention also provided: The said food-processing equipment has a platform for placing the food container;
The section that the said platform for placing the food container adjoins the surface of the food container, has a heating plate, which can transmit heat through the package of the food container, and process the food inside the food container by heat transmission, and discharge the waste gas via air tunnels.

This invention also provided: The food container used for hot-air inject-processing has slot structures for suspending skewered food;
The said slot structures are slots in the sidewall of the food container, which can support the shaft of the skewered food.

This invention also provided: The said air passages that discharges hot air has a structure that remove oil-smoke through heating, comprising the insulation layer and the temperature-controlling device;
The said insulation layer wraps the air passages;
The said temperature-controlling device comprises the electric heating device and the temperature sensor;
The said temperature-controlling device, when working, makes the temperature of the air passages rise, so that the oil-smoke is evaporated or fails to condense.

This invention also provided: The said structures that make the tunnels pierce or exit the inner chambers of the food container, comprise the elevating device;
The said elevating device can change the relative upward-and-downward distance between the food container and the piercing structures.

[The Section for the Methods]

This invention provide a method that processes the food inside the food container, comprising the steps of:
a. Moving the food container, make it moved under the piercing tunnels, right against them, and the said food container is a disposable food container that is enclosed with definite shape;
b. Pierce the food container;
c. Make heat-processing for the foods inside the food container and for the inner chamber of the food container, the said heat-processing is to make the circulating hot air go-inside, or inject hot water, the said go-inside means sucking the air simultaneously to make the air fast circulated;
d. Exit the food container.

This invention also provided: After the step of the said heat-processing, keep the food container and the foods inside warm, keep the food temperature.

This invention also provided: Before the said moving the food container, may pre-heating the food container and the foods inside, to reduce the processing time.

This invention also provided: After the said heat-processing, make the circulating cooling air go-inside, or inject cold water, to cool down the food.

This invention also provided: Before or after or during the step of the said heat-processing, food materials can be injected.

DETAILED DESCRIPTION OF THE EMBODIMENTS

The structures and functions, working patterns and food processing processes in one embodiment of this invention will be concretely described below.

This embodiment of the invention comprises: normal temperature chamber (a box), equipment of normal temperature chamber, low temperature chamber, equipment of low temperature chamber, object-moving system, refrigeration and frost-removing system, product shelves and food containers.

Equipment of low temperature chamber primarily comprise customer fetch opening and various food processing devices. Depending on demands, multiple sets of the same or different devices can be provided as the equipment of low temperature chamber. object-moving system comprises optical device, object fetch device and moving device. The refrigeration and frost-removing system comprises air circulation system, thermal evaporation system and refrigeration system.

The equipment of normal temperature chamber contains necessary parts such as electric control systems (power system, computer and digital control systems), interaction systems (touch screen system, keypad panel), currency transaction system, refrigeration system, tableware distribution device, and provided in the normal temperature chamber as necessary, hot water system, water storage system, negative pressure system etc. These devices are similar to the existing common ones, therefore, no detailed description is provided in this Specification.

Figure 1:
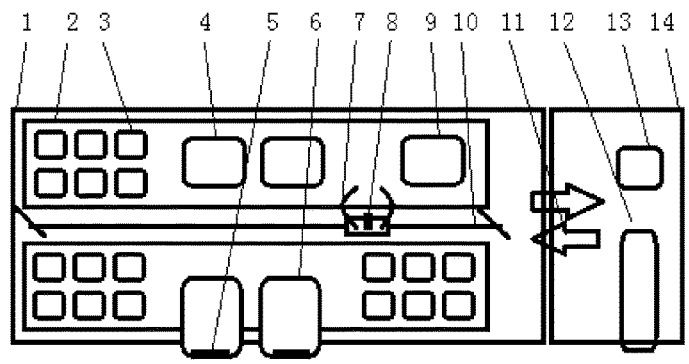
FIG. 1 is the top-view sectional schematic diagram for the whole construction

Overall Structure, in order to reduce the manufacturing cost, the casing adopts a built-in design, as shown in FIG. 1 (top-view sectional schematic diagram, therein, 1. the low-temperature chamber, 2. the product shelves, 3. the food container, 4. the food-processing equipment, 5. the auto gates, 6. the customer-fetching opening, 7. the object-moving system, 8. the optical system, 9. another food-processing equipment, 10. the rails and movable devices, 11. the wind pipes/water pipes/cable pipes, 12. the normal-temperature chamber equipment, touchscreen/operating panel/cash acceptor/card reader/speaker 13. the normal-temperature chamber equipment, computer/cold-air blower/water-heating equipment/water-storing barrel, 14. the normal-temperature chamber, etc), and the system usually has two chambers/casings, one is the low-temperature chamber, the other normal-temperature chamber. The two casings can be designed as split type, and can also be designed as combining type which is fixed and adjoined. They can be arranged up-and-down, or left-and-right. There are gas/liquid pipes and electric cables connecting between the casings.

- The normal-temperature chamber (14) is used to install all kinds of parts working under normal temperature. Normal-temperature chamber equipment (12)(13) such as power system, computer, touchscreen system, button panel, cash acceptor system, refrigerating system, water-storing system, etc. are all arranged in the normal-temperature chamber.
- The temperature of the low-temperature chamber (1) maintains below the freezing point, which can preserve foods for a long time. The low-temperature chamber adopts an embedded structure, and the product shelves (2), the food container (3), the object-moving system (7), all kinds of food-processing equipment (4)(9), and the customer-fetching opening (6), etc. are all arranged inside the low-temperature chamber or are connected to the casings of the low-temperature chamber. The object-moving system (7) can comprise the optical system (8), the rails and movable devices (10). The design of this structure can greatly reduce the quantity, area and manufacturing cost of all kinds of casings and auto gates (5).
- The low-temperature chamber and the normal-temperature chamber adopt the integrated design, and their casings are integrated into the casing of the whole machine, which means that the casing of the low-temperature chamber and the normal-temperature chamber is the casing of the whole machine. The low-temperature chamber part can set no movable gates, and only exchanges the food containers with the outside world via the customer-fetching opening(s) (6) and the object-moving system (7) (when in need of maintenance and repair, the shielding board, which is fixed by the screws on the back, can be opened). And the normal-temperature chamber can set an openable gate when necessary (i.e., when in need of taking cash from transactions, changing the water-storing barrel, etc.).
- The air-circulating system and its components, air valves, air blower(s) and pipes, etc. (11), are arranged in the two temperature chambers. Detailed descriptions of that system will be in the following.

Internal Fields of the Low-Temperature Chamber

Figure 2:
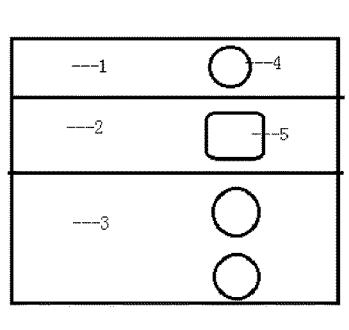
FIG. 2 is the top-view for the division of the fields of the low temperature chamber

- Looking from up to down, as shown in the top-view FIG. 2, it is divided into 3 fields: 1. Non-motion field 2. Motion field 3. Non-motion field 4. Low-temperature chamber equipment 5. the object-moving system) They are divided into the motion field and the non-motion field. Among this, there is one motion field, and there can be one or two non-motion fields, arranged on the single or both sides of the motion field. If the mechanical manipulator used by the object-moving system (5) can not change the direction, and can only face one direction, then there can only be one non-motion field. The two non-motion fields can adopt symmetrical or asymmetrical designs in size, and the detailed sizes are subject to the external space, the usable area and size of the vending machine. The food container and product shelves, the low-temperature chamber equipment (4), the fixed slots of electricity, and gas pipes and liquid pipes are arranged in the non-motion field (1)(3). The object-moving system, including its all kinds of parts (like rails, driving medium, electric motor, switches, sensors, bearings, metal parts, flexible cable slots/relative cables, counterweight & boost components, as well as the optical sensors, etc.) are located in the motion field (2).
- Looking from forth to back, as shown in the front-view perspective schematic diagram FIG. 3: 1. the forth non-motion field 2. the motion field 3. the back non-motion field 4. the product shelves boards 5. the food container 6. the customer-fetching opening 7. the food-processing equipment 8. the object-moving system. The customer-fetching opening (6) is in the forth non-motion field and at the height that is convenient for human body to get objects. There is an auto gate connected to the casing of the low-temperature chamber, and there is also an auto gate connected to the outside world. The food-processing equipment (7) is put on a certain position inside the low-temperature chamber, and is fixed on the product shelves or the casing of the low-temperature chamber, and it is put inside the insulating layer of the low-temperature chamber. And the object-moving system (8) is in the motion field, and it can observe/move/explore into the two forth and back non-motion fields (1)(3), and it can explore into the product shelves boards (4) to pick up or put down the food container (5).

It is obvious that, it is not feasible to put so many devices as heating-source into the low-temperature chamber. Even if all of the heat-source devices have good insulating casings, and even if the electricity loss that caused by the heat radiating from the devices is ignored, as well as described in the background technology two, while putting the devices that can produce hot-and-humid air inside the low-temperature chamber, the exchange of cold-and-hot air will inevitably cause the ice and frost to be condensing, which will impact on the functioning of the machine, especially impact on the functioning of the high-speed mechanical system in the vending machine, because these mechanical systems often use the stepper motor due to cost, and it is very easy for ordinary stepper motors to lose steps in high speed status, and once it loses steps, the subsequent operating will be completely wrong. What solves this issue is the refrigerating-and-frost-removing system (air-circulating system and the thermal-evaporation-and-frost-removing system, the refrigerating system), this series of systems work together to make the mechanical equipment inside the low-temperature chamber to work as if completely under normal-temperature environment.

The air-circulating system, including air pipings, electric gas/air valves, fan/air blower, temperature and humidity sensors, the cold chamber, etc., connects the low-temperature chamber, the refrigerating system, the low-temperature equipment and the external air. All the components have the insulating layers. The air-circulating system has the functions of adjusting temperature, removing moisture and frost, isolating humid-and-hot air.

Figure 4:
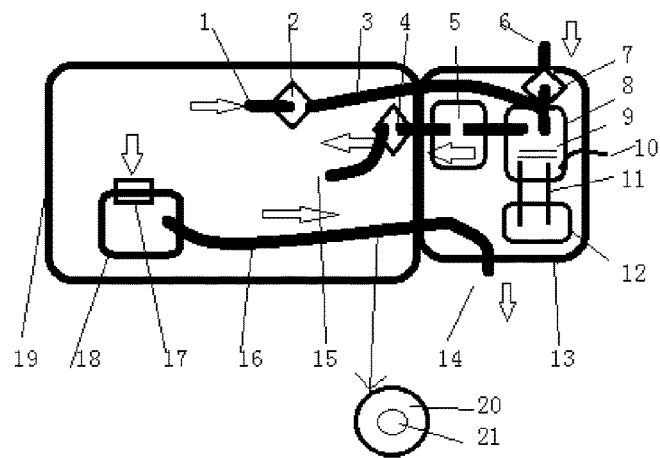
FIG. 4 is the top-view schematic diagram of the air-circulating system

As shown in FIG. 4, the air-circulating system comprise 1. the air inlet for internal circulating 2. the inflow air valve for internal circulating 3. the inflow air pipe for internal circulating 4. the passive air valve for the cold air outlet 5. the air blower 6. the air inlet for the external air 7. the inflow air valve for the external air 8. the cold chamber (the cold chamber can be inside the low-temperature chamber or the normal-temperature chamber) 9. the heat exchanger and the electric-heating-frost-removing device in the cold chamber 10. the water discharging pipe for frost-removing in the cold chamber 11. the heat conducting media/refrigerants/pipes 12. the refrigerating system 13. the normal-temperature chamber 14. the discharging outlet to the external air and passive air valve 15. the cold air outlet 16. the gas-discharging pipe 17. the auto gate of the low-temperature chamber equipment 18. the low-temperature chamber equipment 19. the low-temperature chamber 20. the insulating layer 21. the air pipes All the low-temperature chamber equipment have the insulating casings, and all the air pipes (21) have the insulating layer (20). The following is to describe the functions, structures and working methods of the air-circulating system:

Isolating Humid-and-Hot Air: The mechanical system in the low-temperature chamber does long term working below the freezing point, so if a huge amount of humid-and-hot air comes in suddenly, there will be frosts condensing on the rails, which impacts the normal working and the life span of the mechanical system. So it's necessary to isolate the humid-and-hot air that is produced from the working, opening/closing of the low-temperature chamber equipment (18). Its working method is that, the air blower (5) increases the air pressure inside the low-temperature chamber (19) or another air blower decreases the air pressure of the discharging outlet to the external air (14), to make it form a pressure difference, and at this time the flowing direction of the air inside the low-temperature chamber is from the inside to the outside, and the humid-and-hot air produced by the low-temperature chamber equipment (18) in working process, will be discharged via the gas-discharging pipe (16) and the discharging outlet to the external air (14). In particular, the above method is used for the time when the auto gate of the low-temperature chamber equipment (17) is opened. At the same time when discharging the humid-and-hot air to the external world, the external humid-and-hot air can only follow the preset routing, coming from the air inlet for the external air (6), going through the cold chamber (8) to be cooled down and made the moisture removed, and then going through the cold air outlets (15) to enter the low-temperature chamber, thus realizing the function of isolating the humid-and-hot air from the dry-and-cold air in the low-temperature chamber. In simple terms, in the process of air exchanging, the air coming in and the air being discharged, each have their own fixed routings, and the air coming in must first be cooled down first.

The working principle of this two functions which adjust temperature and remove moisture and frost, is the same as the function of the air conditioner, and well known:
1. While removing the moisture and frost, the refrigerating system (12) dry the circulating air by the means of the cold chamber (8) in the air-circulating system, and then the cold air re-enters the low-temperature chamber, and heated by the heat emitted from the low-temperature chamber, and the ice is volatilizing in the dry air, the frost which is condensed on the equipments in the low-temperature chamber is gradually removed. And the moisture from the air in the low-temperature chamber will be condensing in the low-temperature chamber. The cold chamber comprises the heat exchanger and the electric-heating-frost-removing device (9) and water-discharging pipes (10). The computer controls and periodic launches the electric-heating-frost-removing device, and meanwhile, close the air blower and air valves of the refrigerating system and the circulating system, so as to melt the ice and frost, and discharge it through the water-discharging pipes of the cold chamber.
2. When adjusting the temperature, the valves (2)(4) and air blower (5) will be opened, connecting the refrigerating system (12) and the low-temperature chamber (19). the cold air enter the cold chamber (8) from the air inlet for internal circulating (1) and pipes (3), and then go back to the low-temperature chamber to freeze and cool down the foods. In the cold chamber the refrigerants pipes (11) is connected to the refrigerating system (12). The computer gets the temperatures of the low-temperature chamber via the temperature and moisture sensors. When the temperature is lower than a certain threshold value, the computer controls to close the refrigerating system and the air-circulating system. When the temperature is higher than a certain threshold value, the computer controls the refrigerating system and the air-circulating system to work.

Air Blower and Air Valve Distribution: the air blower can set only one powerful main blower (5), and can also separately set multiple air blowers at various air outlets and air inlets (or the correspondent pipings). And the air valves have two types: one is the passive air valve (4), which is set at the air outlets, and is opened by the air pressure, or air pressure difference, and is closed in the absence of the pressure, or air pressure difference; the other is the active air valve (2)(7), which is set at the air inlets, and is controlled by the computer, and can be opened and closed via the driving of the electric motor or electromagnets. According to the above descriptions, the electric air valves and air blower have 3 working statuses.
1. Refrigerating and Internal Circulating Status, at this time the food-processing equipment and the object-moving equipment are in the status of power-off and sleep, the inflow air valve for the external air (7) is closed, and the inflow air valve (2) for internal circulating is opened, and the air blower (5) and the refrigerating system (12) are working.

2. Non-refrigerating and Non-circulating Status, at this time the low-temperature chamber has reached the temperature needed, and the low-temperature chamber equipment (18) is also in the status of power-off and sleep, and therefore, the air circulating system is not working, and the air blower and the air valve are closed.

3. External Circulating Status (or Internal-and-External-Mixing Circulating), at this time the low-temperature chamber equipment (18) is working, and the inflow air valve for the external air (7) is opened or half-opened, and the inflow air valve (2) for internal circulating is closed or half-closed, and the air blower (5) is working. The specific extent of opening or closing of this active-type air valves, is controlled by the computer via the electric motor or the electromagnets.

Distribution of the Inlets and Outlets for External Air: the normal-temperature chamber adopts the half-open design, with groove holes and air fans on the casing, and the internal air can exchange with the external air, and the inlets and outlets for external air can be in the form of pipings distributed on the exterior of the casing, or it can also be inside the open space of the normal-temperature chamber.

As described above, the low-temperature room equipment has requirements concerning the gas-discharging pipings and the auto gate. The following is to describe the customer-fetching opening and the structures of the food-processing equipment, which conform to those requirements.

Figure 5:
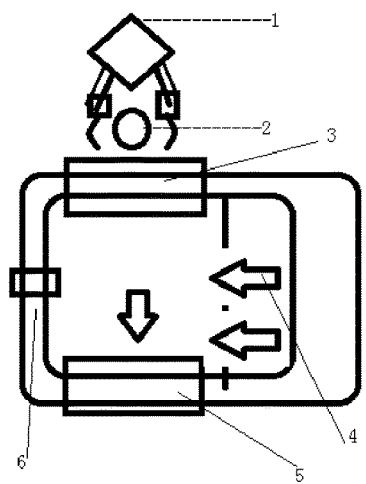
FIG. 5 is the top-view schematic diagram of the customer-fetching opening

Customer-fetching Opening, is the passage that connects the low-temperature chamber and the external world, from which the customers get the sold foods. The structure of the customer-fetching opening is as shown in FIG. 5, 1. the customer-fetching opening 2. the food container 3. the back auto gate 4. the infrared sensors 5. the front auto gate 6. the gas-discharging outlet. The customer-fetching opening (1) is an insulating casing with both the back and front auto gates, and inside the casing there are multiple infrared sensors. The opening and closing of the auto gates are controlled by the computer. When the back auto gate (3) is opened, the object-moving system puts the sold foods inside, and then the object-moving system retracts to exit, the back auto gate (3) closes, the front auto gate (5) opens, and for the customers to take out the food. The computer compares the current that is going through the infrared sensors (4) with the threshold values, and thus learns whether the food container is taken out, and after the food container is taken out, the computer will control to close the front auto gate (5). And the gas-discharging outlet is connected to the air-circulating system, the air inside the low-temperature chamber will come in from the opened front auto gate (5), and because when the front auto gate (5) is opened, the back auto gate (3) is closed, the hot-and-humid air will stay inside the chamber of the customer-fetching opening. After the front auto gate (5) is closed, while the back auto gate (3) is opened, the hot-and-humid air between the two auto gates and inside the customer-fetching opening, will be discharged from the gas-discharging outlet (6). After that the customer takes out the food container and the front auto gate (5) is closed, the front auto gate (3) can be slightly opened, and the air-circulating system continues to work, waiting for the hot-and-humid air in the internal chamber of the customer-fetching opening discharged, after then the customer-fetching opening is fully closed, which is to prevent the moisture to condense on the lens of the optical equipment, impacting the functioning of the optical equipment. The bottom plate can also be made of glass, and in this way the infrared sensors can be installed under the glass bottom plate, through the glass they sense and measure the food container. The QR code scanner or camera-type QR code scanner can also be used under the glass, to scan and get the QR code information that is at the bottom of the food container on the glass bottom plate. The metal detector can also be installed to know the material of the food container put in.

Figure 6:
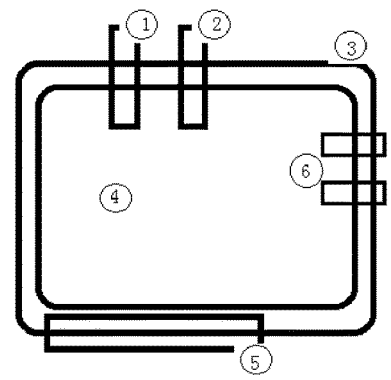
FIG. 6 is the top-view schematic diagram of the food processing equipment

The food-processing equipment, is the equipment which is capable of hot processing for foods (microwave oven, the electrical heating oven, etc), or changing the composition of the foods in the container, or operating on the food container (operations such as opening, closing, piercing, etc.). The devices comprised in the food-processing equipment have the same functions as the correspondent common devices, but they are all made electrical-automatic/electric, for example, auto gates, electric water pump, electric air valves, etc. are adopted, controlled by the computer for opening and closing. As shown in FIG. 6, 1. gas-discharging pipe connected to the air-circulating system. 2. the cable pipe 3. the insulating casing 4. the correspondent internal equipments 5. the auto gate 6. the cooling pipings for the heating components of electric appliance. The specific working method is that, when the object-moving system puts in and takes out the food container, the auto gate (5) is opened; when it is working or idling, the auto gate (5) is closed; the computer controls the opening and closing of all various electrical components via the passing or not of the current, and there is controlling cables going through the pipe (2). In terms of structure, they all adopt the insulating casings (3) and is connected to the air-circulating system via gas-discharging pipe (1). The heat-dissipation and cooling for the heating components such as the correspondent internal equipment (4) (take the microwave heating device for example, comprising the microwave transmitting, the circuit, the heating chamber, the turntable, and fans) is done through exchanging with the external air via the independent insulating piping (6). The hot air inside the internal heating chamber of the food-processing equipment (for instance, the microwave internal chamber) is discharged via the gas-discharging piping.

Figure 7A:
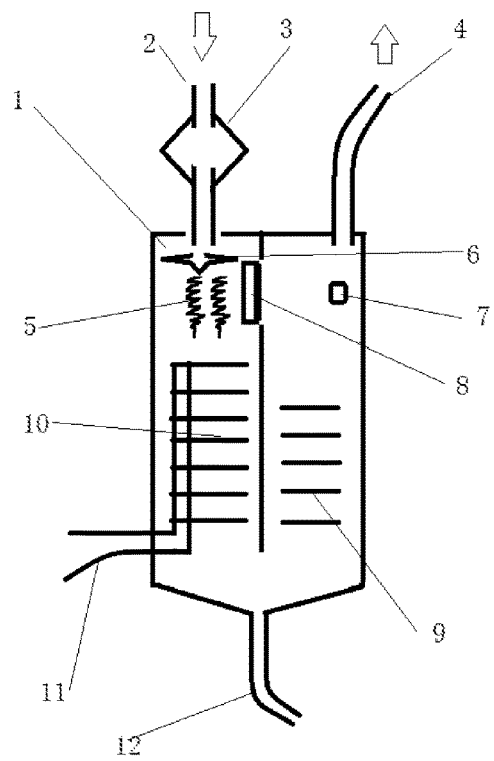
FIG. 7a and FIG. 7b are the schematic diagram of the structure of the cold chamber
Figure 7B:
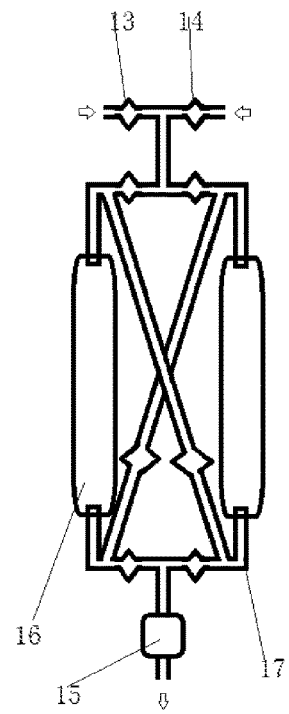

The refrigerating system, is as described in the following. It adopts the above air-circulating system, the external hot-and-humid air will mainly come in from the cold chamber, and then the ice and frost will be condensed mostly in the cold chamber, which might obstruct the passage of the cold chamber over time. So, it is necessary to heat to defrost regularly in the cold chamber. But, the selling in the vending machine can happen at any time, and if the selling happens at the time when the cold chamber is heating and removing the frost, the cold chamber will temporarily not be able to cooperate with the selling and food-processing in the vending machine, so the cold chamber needs to be available at any time. In this way can the issue be solved, as the refrigerating system uses two identical systems in parallel to work alternatively. In addition, the refrigerating power required is different and has great changes at the time when the selling in the vending machine happens or when it does not happen. Therefore, the refrigerating power needs to be stored up. As shown in FIG. 7a and FIG. 7b, two cold chambers, which are the same as the cold chamber (1), are working alternatively, and each has the air inlet and inflow valve (3). When one of the correspondent valves of the two independent cold chambers is opened, the air coming in will enter the correspondent cold chamber and at this time the correspondent valve of the other cold chamber is closed, and the cold chamber which is not refrigerating heats to defrost. The heating and removing of the frost is done via the electric heating wires (5), and inside the cold chamber there is the temperature sensor (7) for adjusting of temperature. The ice water after removing the frost will flow out via the water-discharging outlet (12), and the water-discharging outlet is a thin tube. Inside the cold chamber there is also the valve (8) and the air fan (6), which are used to strengthen the speed of heating and removing the frosts. The air coming in will first go through the evaporator (10) which is connected to the refrigerating system (11), or exchanger with refrigerating media, and then enters the cold reservoir (9). The cold reservoir is heat exchanger that is stack-up and comprises antifreeze agent which can resist low temperature, and it is used to balance the fluctuation of the refrigerating power.

In the above plan, when the cold chambers of the refrigerating system work alternatively to remove the frosts, one of the cold chambers is needed to stop working and rise from about −25 degrees Celsius to the melting point of ice or above 0 degree Celsius, which will cause the consumption of power, and will also cause that refrigerators can not to work at the same time, making the refrigerating power to stay idle. The following improvement plan, which dynamically changes the routing and the order of the two working cold chambers, can solve the above issue. As shown in FIG. 7a and FIG. 7b, its principle is that, two cold chambers (16) are in the piping, one by one, end-to-end connected to each other, and the first-level temperature is controlled at the temperature slightly over the ice point, and the second-level is controlled at the finally needed temperature (approximately minus 18-30 degrees Celsius), and the waiting-for-cooling air coming in from the external air inlet (14) will first goes through the first-level cold chamber to get cooled down to near the ice point, and then enters the second-level cold chamber to get further cooled down. When in need of removing the frosts, all it needs is to adjust the routing of the pipings and the valves, and in this way the first-and-later relation of the two cold chambers is switched, which means that the first level becomes the second level, and the original second level becomes the first level, and accordingly the temperature of the cold chamber originally below the ice point is adjusted to above the ice point, and therefore, the condensed ice and frost will get melted. Regardless of how it changes, the air flow is always flowing out from the main air blower (15) of the air-circulating system. In this way, the two cold chambers can work together, and the two correspondent refrigerators can also work at the same time, without impacts from the operation of defrosting. Then because the switching of the two cold chambers is done above 0 degree Celsius, the electric heating wires (5) and the air fan (6) and the valves (8) can be omitted. When the air-circulating system is internal circulating, because the air coming in from the passage of low-temperature chamber (13) is already below the ice point and the refrigerating power needed is relatively small, the cold chamber above 0 degree Celsius can stop working, and all it needs is to change the routing of pipings and valves to use only one chamber. If the temperature in the low-temperature chamber is relatively high, it is necessary to quickly bring down the temperature, then in such cases, it is allowed to connect the two cold chambers in series or in parallel and use them at the same time. This case may happen at the first start-up of the equipment, or after the selling peak.

Figure 8:
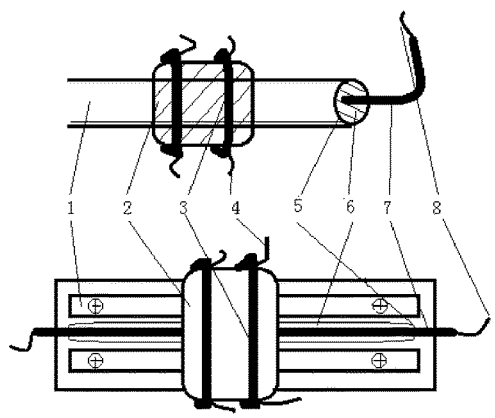
FIG. 8 is the schematic diagram of the thermal-evaporation-frost-removing system

The thermal-evaporation-frost-removing system, its function is to prevent ice and frost from being condensed on the surface of the rails and the surface of the bearings, and to melt and evaporate the ice and frost already melted on the surface of the rails and the surface of the bearings. When the based system has frequent operations over a long period of time, which means that the foods inside it are frequently sold within a long period of time, or when the cover is opened for repairing, mere the air-circulating system can neither fully prevent ice and frost from being condensed in the low-temperature chamber, nor quickly remove the already-condensed ice and frost, and therefore, this system is installed. Its working pattern is to make the temperatures of the rails and the bearings slightly above the ice point, and in this way the ice and frost cannot be condensed or melted and evaporated. When the hot-and-humid air is produced from the working of the customer-fetching opening and the food-processing equipment are working, the thermal-evaporation-frost-removing system works; when the equipment inside the low-temperature chamber needs maintenance and repairing and the status is switched from low-temperature to the normal-temperature, the thermal-evaporation-frost-removing system works; in the other time, the thermal-evaporation-frost-removing system does not work. Its structures are as shown in FIG. 8, 1. the rails 2. the slider/the bearings 3. the electric heating wires for the bearings 4. the resistance wires 5. the ends of the rails/inner chamber 6. the heat-conducting material 7. the inner electric heating wires inside the rails 8. the resistance wires. The rails can use hollow plain shaft, and the resistance wires (4) go through the inner chamber (5) of the hollow plain shaft (1) (as shown in the upper part of the figure), and the inner chamber has the heat-conducting material (6) such as the silicon grease. The electric heating wires produce heat to be conducted to the external surface of the rails, thus evaporating the ice and frost. If the half-enclosed rails are used, like linear guideways and the plain shaft with supporting, etc. (as shown in the bottom of the figure), then the electric heating wires can be installed on/adjoined to the supporting-section of the metal parts, and conduct the heat to the rails via the supporting section. Because the electric heating wires only work periodically or at a certain time like doing repairing work, the average amount of heat produced, if calculated, is little, which has no impact on the refrigeration for the low-temperature chamber. In addition, at what specific time to use the thermal-evaporation-frost-removing system, can be known via calculation of the extent of the frequency of the opening and closing of the low-temperature chamber and the sublimation rate of ice and frost.

In the low-temperature chamber are there conflicts between the low temperature and the heating from the heating wires and the motion motor? Actually no, because the heat produced by the high-power food-processing equipments and their piping section have already been insulated via the insulating casing, the insulating layer and the air-circulating system. The remaining heating components have relatively small power, and the motion motor and the heating wires are just working for a short time, which is almost not working in the absence of foods-selling, so the average amount of heat produced is relatively little. The heat here will be taken away by the circulating cold air. The cost of the used electricity can be negligible when compared to the profits from the food selling.

The food container can adopt the commonly-used square or round disposable tableware, or can be customized to specific sizes. The food container has the lid, which can be opened or separated, and the food container can be sealed by closing the lid. The food container is made from the microwave-compatible materials such as pp plastics, and some of the embodiments adopt the grilling-compatible aluminum foil material. The shape of the food container can match the shape of the mechanical manipulator of the object-moving system. As shown in FIG. 9, 1-4. the food container 5. the supporting plate of the product shelves. The food container can be put in side by side, stack-ups/three-dimensional, which means that the container can be put on the lid of another container; it can also be put in one single layer, which means the food containers are directly put in one single layer on the supporting plate of the product shelves. On top of the lid of the food container, it should be made pits that can match the sizes and shapes of the bottom of the food container with small clearances, so that when the food containers are stacked up from up and down, they can be right against with each other. As for the side by side placement of the containers, there needs to be space between columns so that the object-moving system can take out the food container. In addition, as needed, the food container can have design variants: a. for instance, when tableware cannot be provided around the vending machine, a groove can be made on the lid of the food container to hold disposable tableware (spoons, chopsticks, forks, etc.) b. for instance, when the customers need to carry the foods for a long distance, the food container can also adopt the design with inner-and-external double layers, in which the external layer adopts a carton and the inner layer put disposable tablewares and food containers.

Figure 3:
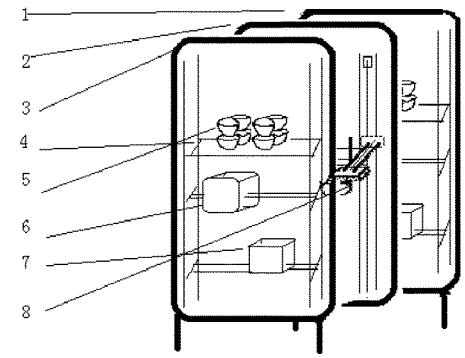
FIG. 3 is the front-view perspective schematic diagram of the low temperature chamber

The product shelves, as shown in the front-view perspective schematic diagram FIG. 3, are set in the non-motion field, and there are one product shelf set in each of the non-motion fields. The product shelves adopt the multi-layer structures similar to the daily-used storing product shelves, and the framework is made of metal, and each layer is sets the partition board, and the food container is put on the board. Some of the food-processing equipments are also fixed on the metal framework. In order to prevent the food container from shifting due to the vibration, which is caused by the operation of the vending system or other reasons, and the partition board supporting the food container can be set taper-shaped flat-bottom pits or partition ridges or division plate, and its shapes can match the food container which is put there, and with slight clearance. The food container is put in the pit/partition ridges/division plate, which can keep the position of the food container. The product shelves can set temporarily storing place, so as to save the transferring time of the food container and cool down the overheated food container after processing.

The object-moving system is to be described as the following:

The mechanical principle and working method of the mechanical manipulator is a well known technology. It uses the computer to control the servo/stepping motor to generate driving force, and uses the transmission parts (the timing belt/lead screw/rack/gear, etc.) for driving, and cooperating with balance-weight and force-assisted parts to balance the weight and increase the speed, and the mechanical ends (the mechanical pincers/suction nozzles, etc.) can make three-dimensional motions (sliding or rotating) along the rails or the rotation shaft. Therefore, this specification will not repeat these common senses. In general, because the commonly-used the mechanical manipulator may not exceed 6 degrees of freedom, and also because used in vending machine, it does not receive much strength, and require less precision compared to the machine tool industry, therefore the cost is not high.

Figure 10:
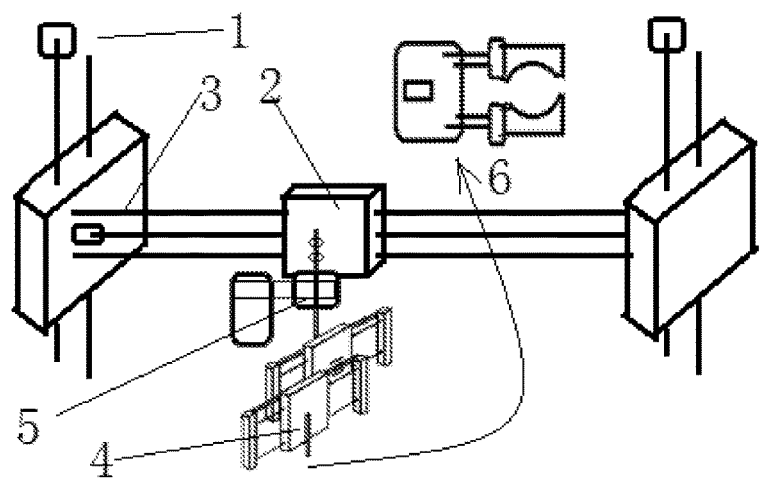
FIG. 10 is the schematic diagram for the structure of the objecting moving system

The mechanical manipulator of this embodiment of the invention is specially designed to explore into the product shelves and equipments to pick up or place the food container, and work in limited space. When it stretches, it can explore into the product shelves and the various cell equipment, and when it retracts, it can fully out of the range of the product shelves and equipments. As shown in FIG. 10, 1. the up-down movement mechanism 2. the movable junctions (connecting 4/5/6) 3. the left-right movement mechanism 4. the forth-back movement mechanism 5. the rotation axis (along the up-down direction) 6. the mechanical clamp Its structural feature: the left-right movement mechanism (3) is based on the up-down movement mechanism (1), and the mechanical pincer (6) can rotate along the up-down axis, and the axis-rotation (5) is based on the movement junctions (2) on the left-right movement mechanism (3), and the forth-back movement (4) is based on the rotation axis (5), and the forth-back movement mechanism has the multi-level retractable design which can greatly stretch, and the mechanical clamps (6) are based on the forth-back movement mechanism, and the mechanical clamps (6) are the horizontal parallel clamps, (which means that the clamps plane is parallel to the bottom side, and the left and right clamps are parallel to each other.), which can release and grip the food container.

Because the entire system is based on the up-down movement mechanism (1), the up-down movement mechanism (1) needs to support all the weights of the movable parts and the pushing force for high-speed motion. In the meanwhile, the food container is usually relatively bigger, and with the liquid inside which has considerable weight, and because foods belong to regularly fast moving consumer goods, the quantity of sale is larger than other goods, so it needs much larger storing space, and accordingly, the size of the vending machine, the travel distance and the weight of the mechanical system are bigger. So here the high-speed transmission parts are needed. The timing belt is the transmission method to do the high-speed motion in that travel distance, and which is suitable in terms of cost and precision. But the timing belt has a limited capability of loading, so the up-down movement mechanism (1) needs to have balance-weight devices. In addition, in the process of high-speed motion, the electric motor is easy to lose steps, which may causes that the two side of the up-down movement mechanism may not be synchronous, and make it stuck and not working. Therefore, it needs to use a hard shaft to connect the timing belt pulley, so as to synchronize the two sides of the up-down movement mechanism.

The object-moving system can also install components like cameras, optical sensors, etc., which are used to record the working process of the object-moving system, or conduct human remote assistance, or used to dynamically adjust the motion of the object-moving system.

Specific Working Methods and Process

Restocking Methods:
The restocking method of this machine means that the external goods enter the main casing of this machine, that is the low-temperature chamber. The low-temperature chamber does not install operable gates, and only exchanges the food containers with the outside world via the customer-fetching openings and the object-moving system. And when in need of repair, the shielding board that fixed by the screws on the back can be opened for repairing. It means manually putting the products (the food container) on the inner platform of the customer-fetching opening, and the object-moving system of this machine picks up the products via the customer-fetching opening, and puts it or stacks it up on the product shelves, thus finishing the restocking process. The auto gate of the customer-fetching opening on this machine replaces the large operable gate on the casing of the common vending machine. The mechanical manipulator of the object-moving system replaces manpower to put the products on the product shelves. And each time when the restocking personnel inputs one category of products, a message will be sent to the computer inside the machine to inform the computer the category and quantity of the products replenished. (or, the vending machine automatically scans the barcode on the food container to automatically get relevant information.) The computer controls multiple customer-fetching openings inside the machine to open the auto gates alternately. When the restocking personnel are restocking in one of the customer-fetching openings, as shown in FIG. 5, the front auto gate (5) is open, the back auto gate (3) is closed. The restocking personnel puts products in, and send relevant information to the computer to inform the computer that it can start to pick up products in specific category in the specific customer-fetching openings. Then the front auto gate is closed, the back auto gate is opened, and the mechanical manipulator of this machine starts to pick up the products. After fetching the product, the front auto gate is opened again, and the back auto gate is closed, and the computer sends out a signal to inform the restocking personnel that the restocking of this product has been finished. The mechanical manipulator stores the products on a correspondent position on the product shelves and then proceeds to repeat this process.

Figure 9:
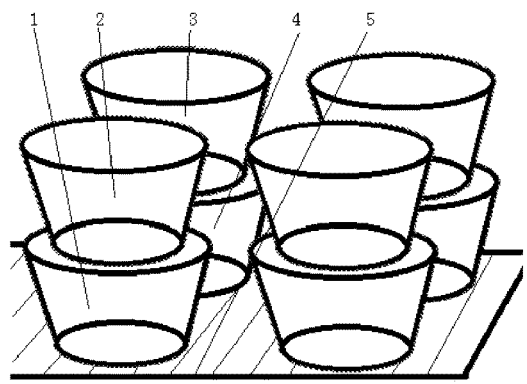
FIG. 9 is the schematic diagram of the placement of the food containers

Storing Methods:

The foods in this machine are put in the above-mentioned product shelves of the low-temperature chamber, and its refrigerating method (the air-circulating system) use air cooling refrigerating for conveniently automatic defrosting, and it's similar to the enclosed refrigerator which is usually used to store the quick-frozen foods, the food is usually put in below the temperature of −18 degrees Celsius, and each portion of food is sealed in a disposable food container, which is isolated from the environment air and keep the food moisture. As shown in FIG. 9, compared with other vending machine this machine has a different manner for storing food, which the food container is stacked up like toy bricks by the mechanical manipulator. The way of stacking-up of the food container is that:

1. There is a certain left-to-right distance between the food containers. The left-to-right distance is for the clamp to move and explore into the both sides of the food container so as to clamp and fetch the container, the distance is slightly larger than the width of one clamp.
2. Stacked up directly. The up-down stacks can save space to put more containers, and at the same time it use the casing of the container as the support, and simplify the structure of the product shelves and reduce the cost.
3. Stacked layers are in different heights in forth and back. As shown in FIG. 9, it is the situation of the same height in back and forth, and in practice, the stacked layer that is close to the mechanical manipulator of the object-moving system should be higher than the stacked layer that is away from the mechanical manipulator. Because the mechanical manipulator of the object-moving system has the retracting mechanism (as shown in FIG. 10 component-4), and has certain height and size, and the retracting mechanism is higher than the mechanical manipulator, and when it explores into the product shelves over a certain distance, the retracting mechanism will also go inside the product shelves and is constrained spatially by the upper board of the product shelves. Because of this, in order to avoid the retracting mechanism touching the top plate of the product shelves, the mechanical manipulator is not allowed to reach the upper space of the stacked layers which are far away from the mechanical manipulator. It means the number of its stacked layers is smaller than the one close to the mechanical manipulator.

The Processing and Selling Method of Foods

After the computer receives the purchasing orders from the customers, the mechanical manipulator of the object-moving system picks up the food container in the correspondent category in the product shelves, and puts them in turn into all kinds of food-processing equipment in the low-temperature chamber for processing. When putting in or taking out the food containers, the auto gates of the equipments will be opened accordingly as the mechanical manipulator goes in and goes out, and will be closed after the mechanical manipulator exits, and when the equipment working, the auto gates are also closed. After the processing is done, the auto gate of the food-processing equipment is opened, and the mechanical manipulator takes out the food container. And then the auto gate inside the customer-fetching opening is opened, and the food container is put into the customer-fetching opening by the mechanical manipulator. After the mechanical manipulator exits, the inner auto gate of the customer-fetching opening is closed and the outer auto gate is opened, and after the computer via the sensors learns that the customers have taken out the food containers, the outer auto gate is closed, and the transaction is done. In this process, the air-circulating system in the whole course will conduct operations like removing the hot-and-humid air as described above.

SPECIFIC EXAMPLES

The object-moving system has many forms. In the following, 5 specific examples are presented from different patterns of placing the food containers and from different structures of the object-moving system, and their differences with the above common practice are also described:

One Optimum Example is Pit-Groove & Clamp Vending Machine the rest parts of this structure are the same as the above described general examples, but the pit-groove plates and the mechanical clamp, which can match the particular shapes of the food containers, are used. This construction has lower requirements on the controlling software, and is especially suitable for the places where the vending machine may be moved.

Figure 11:
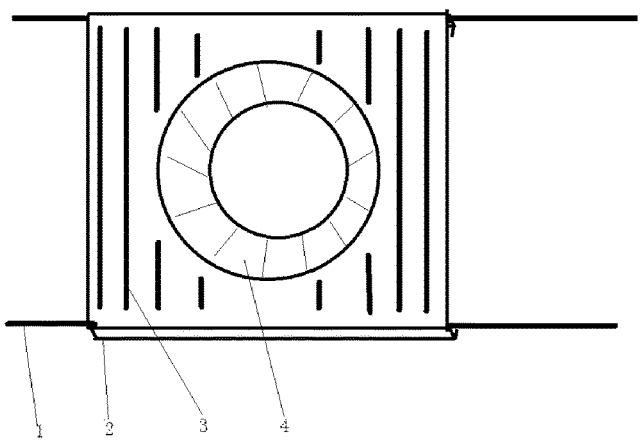
FIG. 11 is the top-view schematic diagram of the pit-groove plate

This kind of vending machine adopts a type of pit-groove plate. This pit-groove plate can be easily batch-made from simple machining, which use sheet plastic for vacuum forming or use sheet iron for punch forming. As shown in FIG. 11, the size of this pit-groove plate can match supporting frame (1) of the product shelves, and has the turn-up edges (2) to directly snap in the product shelves; the plate is provided with striation-grooves (3) in the forth-back direction to strengthen the supporting capacity of the thin plate; more importantly, there are pits & grooves (4), which is shallow and for holding the food container. The shapes of the pits & grooves match the bottom shapes of the food containers. The pits & grooves can have multiple levels (stair-like pits & grooves) to support food containers in various sizes. This pit-groove plates are fixed, put or arranged on the supporting frame of the each layer of the product shelves at consistent spacing. The pit-groove plate is primarily used in the product shelves, but can be also put in the low-temperature chamber equipment. However, high temperature may be generated when the food is processed inside the food-processing equipments in the low temperature chamber, therefore, heat-resisting material shall be adopted. Besides, if the pit-groove plate is produced through metal and punching technology, for forming pit-groove in such large area, it is relatively high-cost. In that way, ring-shape ridges (similar to the shape of ring mountain of volcanic vent) in the same size can be used to achieve the same function.

Figure 12:
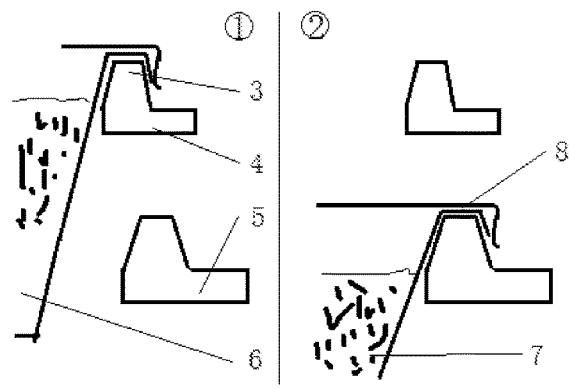
FIG. 12 is the front-view schematic diagram of the mechanical manipulator clamp

This vending machine also uses a kind of clamp. This clamp is horizontal mechanical clamp, which is more suitable for clamping thin or low-strength food containers. And this kind of clamps have a certain shape, the clamps fetch the food container from it's both sides, which the food container is in the center of the two clamps. And multiple set of clamps in different size can be install with certain up-down spacing, that is, the clamps stack up at certain spacing. The distance between the two sides of the clamps in the bottom layer is a little bigger, and the distance of the upper is a little smaller, so that the mechanical manipulator can has multiple set of clamps to fetch food containers at different sizes and shapes, and the sensor can be only placed at the bottom layer clamps. The clamping force of the clamps is generated by the speed-reduced stepper/servo motor, which can precisely control the clamping distance or force. Based on the shape of the food container, there are multiple alternatives for the shapes of the clamps, it can be round, rectangular or the mix of them. For example, the common disposable bowl-shaped food container which has tapered outer sidewalls and has turnup on the opening, as shown in FIG. 12 the sectional front view, its clamp can hold a big or a small container at two sizes, the left (1) is the situation of clamping small container, and the right (2) is the situation of clamping big container. There are (more than) two layers of clamps at both the left and the right sides, and the upper clamps (4) are used to clamp container (6) in the smaller size, and the lower clamps (5) are used to clamp container (7) in bigger size, and the inner side of the clamps are tapered cylinder shape to match the food container, and they have bulging so as to be stuck into the turnup groove (8).

A Specific Example of Using a Optical System and Flat Shelves, and Combining the Optical System and the Object-Moving System This specific example uses the optical system to replace the pit-groove plates in the above specific example. The reason to use the optical system here is: The mechanical vibration, or the customers beat the vending machine, or the vending machine is moved, or sudden power failure, or mechanical errors for some reasons, and all these may make the food containers moved. So the object-moving system in the above optimum example that moves along preset routines without auto feedback, it may be possible, accidentally knock or push the food container down, in that way, a series of following operations will become a disaster. At this moment, remote human assistance might solve this, however it does not have enough stability. Therefore, the optical system is adopted to get the position of the food container to increase the stability of the system.

The optical system comprises the camera and multiple short-distance reflective IR sensors. The specific structures of the optical system are as follows:

The camera can record images inside the equipment, can get the food information and location information from image recognition. For example, it can get the barcode printed on the food container, and make the object-fetching device right against the food container.

The reflective IR sensors are used to accurately get the position information of the food container. The reflective IR sensors are distributed in different positions and separately facing different directions, and can get the distance information in multiple directions between the food container and the sensors. With the changes of the relative position between the optical system and the food container, the amount of reflective IR will also change accordingly and make the current going through the sensors change. By measuring the extreme values of the current change, or by comparing the current that goes through multiple sensors, it is able to get the accurate information of the relative position of the food container.

The optical system is integrated with the object-moving system. There are multiple reflective IR sensors on the clamp, and via the amount of the reflective IR, the changes of the relative distance between the food container and the sensors can be monitored, and thus the accurate relative coordinate for a certain direction comparing the food container with the object-moving system is obtained. The sensors on the clamp usually lie in the top surface of the lower clamp and between the two layers of clamps.

Figure 13:
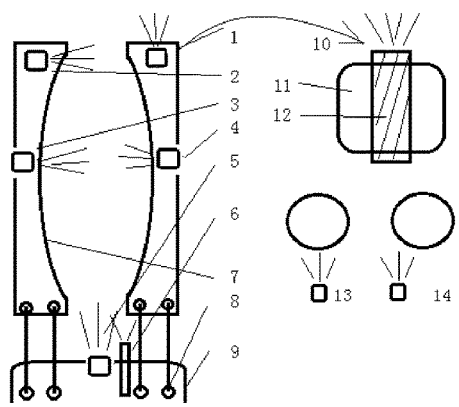
FIG. 13 is the top-view schematic diagram of the asymmetrical forward-and-sideward layout of the IR sensors

The IR sensors in an asymmetrical forward-and-sideward layout, as shown in FIG. 13, 1. the forward sensor a 2. the internal sensor b 3. the internal sensor c 4. the internal sensor d 5. the forward sensor e 6. the camera 7. the clamp 8. the joints of the clamp 9. the mechanical part of the clamp 10. the enlarged view of the sensor 11. the fixed casing of the sensor 12. the reflective IR sensor 13. the right-against reflection 14. the non-right-against reflection. The specific working methods and processes are:

1. The mechanical manipulator of the object-moving system move to the preset coordinate, and uses the camera to take images of the food container, and the computer recognize the images, so as to get the rough coordinate of the food container.
2. Before the mechanical manipulator of the object-moving system clamps the food container, it first moves to the front of the rough coordinate of the food container that is to be taken out, may be in the position slightly left or right, clamping.
3. The forward sensor a starts to work, and the mechanical manipulator first do horizontal and parallel movement in the motion field (from left to right, or from right to left, according to the specific offsetting of the previous movement), and at this moment, although the clamps do not contact with the food container, it moves left and right to change the distance between the forward sensor a and the food container, as shown in 13/14 of the FIG.

13, and compared with non-right-against reflection, only when the forward sensor a is right-against the food container in the forward direction, the amount of the reflective IR reaches the maximum, which means that the current going through the IR sensors is the maximum, and in the process of the movement of the object-moving system, the computer conducts real-time monitoring for the current, and records the coordinates of the object-moving system when the current going through the sensors reaches the maximum/extreme/threshold value. This means that the sensor is right against the horizontal coordinate of the food container in the forward direction, and uses this coordinate to get the relative horizontal coordinate between the food container and the object-fetching device, so that the mechanical manipulator of the object-moving system can be right-against the food container in the forward direction. And after the computer receives the information of current changes, the forward sensor a can stop working.

4. The mechanical manipulator is right-against the food container. According to the standard size of the food container, and the computer controls the mechanical manipulator to stretch and make the internal space of the clamp is slightly bigger than the size of the food container. In that way, it can go forward to explore in without touching the food container.

5. Initiate the internal IR sensor b, and then make it explore into the product shelves/the exterior of the food container, and the amount of IR reflection reaches the maximum when this sensor faces right against the food container in the side direction of the clamp, which means that the current going through the IR sensor reaches the maximum value, and the computer monitors the current in real-time in the moving process of the object-moving system, records the coordinate of the object-moving system when the current going through the sensor reaches the maximum/extreme/threshold value, which means that the sensor is facing right-against the longitudinal coordinate of food container in the side direction of the clamp. From these coordinates it is possible to get the relative longitudinal coordinate between the food container and the object-fetching device, so as to make the object-moving system face right against the food container. When the current changing information is obtained, the internal IR sensor b can stop working.

6. The IR sensors c/d/e have multiple functions. The first is, using the method of weighted decision, to confirm and correct the information obtained by the sensors a and b, to reduce the interference to the reflective IR sensors from the printing, crease and dirt of the food container; The second is more accurate obtaining the coordinate of food container which is non-circular, for example, the rectangular food container without arcs. The specific principle is that when the clamp of the mechanical manipulator moves to a position to surround the food container or when the food container is in the middle of the clamps, which means moving to the coordinate of the food container which is generated by the information from sensors a/b and getting ready to fetch the food container, at this moment the current going through the sensors c/d should be the same or close. By comparing the currents going through c/d and combining them with the information of the sensor a, the computer can know the distance from the left and right clamps to the food container, and adjust the horizontal coordinate of the mechanical manipulator. By comparing the sensor e and the threshold value and combining it with the information from the sensor b, the computer can know the distance from the left and right clamps to the food container and adjust the longitudinal coordinate of the mechanical manipulator.

7. The movement for object-fetching: the clamps are retracted to the size of the food container, clamping the food container. When tightening the clamps, the object-moving system will make forward and backward moving to compensate for the coordinate changes of the clamp center when the clamp retracting. After the clamps clamp the food container, it slightly raises the food container to make it detach from the bottom support and then the mechanical manipulator moves back. Then the pick-up of the food container is done.

Figure 14:
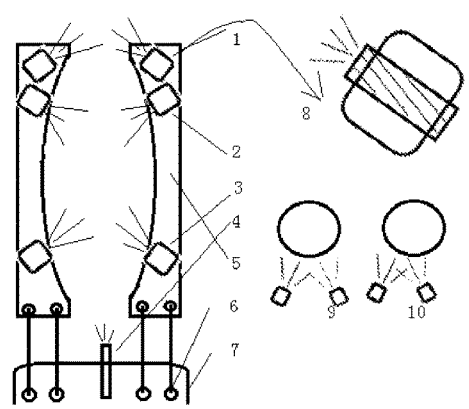
FIG. 14 is the top-view schematic diagram of left-right-symmetrical & slant layout of the IR sensors

In the following, a left-right-symmetrical & slant layout for IR sensors are given, (the final layout can be one of the two layouts or their mix, or the partial), as shown in FIG. 14,
1. the forward sensor a 2. the internal sensor b 3. the internal sensor c 4. the camera 5. the clamp 6. the joints of the clamp 9. the mechanical part of the clamp 8. the enlarged view of the sensor 9. the right-against reflection 10. the non-right-against reflection, the specific working pattern and process are similar to the former layout, and their differences are as follow:

1. The front-back alignment. When the mechanical manipulator moves in front of the food container, and when the current that goes through the forward sensor a and the sensors at its left symmetrical location are equivalent (namely, the absolute difference between the two is no bigger than a certain threshold value) or when the absolute difference is the minimum, the mechanical manipulator is right-against the food container.

2. When comparing the currents going through the sensors, if the feedback currents for the two sensors are not equivalent while measuring the same distance, the computer needs to make compensation when testing the machine, and adjust the calculating parameters.

3. The left-right alignment. When the clamps are moving longitudinally in the both sides of the food container, and when the current that goes through the forward sensor a and the sensors at its left symmetrical location are in the maximum, the sensors is right-against the food container in the slant direction, and then the computer calculates the coordinate for the longitudinal alignment, and makes it aligned with the middle of the clamps in left-right direction.

4. The final adjustments. When the food container is roughly in the middle of the clamps, the internal sensors b/c and the sensors at its left symmetrical location performs the function for removing interference and for adjusting and modifying. When the currents going through those 4 sensors are the identical, the food container will be in the right middle of the food container. Based on this, the computer adjusts the coordinate of the mechanical manipulator.

Figure 15:
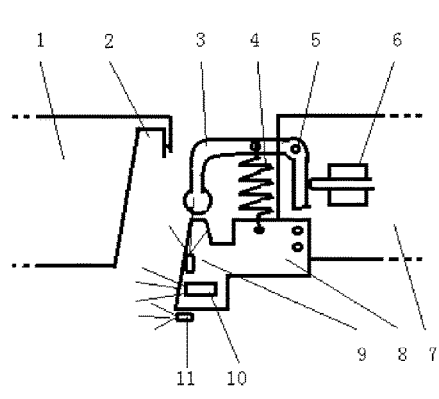
FIG. 15 is the horizontal-view sectional schematic diagram of the forth-pincers manipulator

One Specific Example is a Construction that Use Pincers Manipulator and Plain-Board Product Shelves There is a forth-pincers manipulator that is more suitable for food containers that are more high-impact, and it is simpler in construction and controlling. However, the food containers can only be arranged in single layer, no stacking-up, therefore, more shelf layers are required. As shown in FIG. 15 (in sectional horizontal view), 1. Container, 2. Turn-up groove of the container, 3. Clamp's movable part, upper part, 4. Spring component, 5. Rotation shaft, 6. The driving device of the clamp, 7. Palm & arm of the mechanical manipulator, 8. The fixed part, lower part of the clamp, 9. upward sensor/turn-up sensor, 10. Camera, 11. Forward sensor.

The forth-pincers manipulator, its clamping pattern is that it only grips the food container at the front end of the container, its pincers clamp the turn-up and groove at the front end of the container, and the pincer resists against the front end of the container, make the food container in an pose that keep the container opening upward. It has a structure that the two parts of the pincers are separated up and down, the upper part is movable and can grip the turn-up and groove of the container from the upper, the lower part is a fixed part, and its shape can fasten the turn-up and groove of the container, and can resist against the lower part of the front of the container, and its shape matches the lower part of the front of the container. In this embodiment of the invention, the driving device of the pincer, one solution is to generate clamping force from the spring component and to generate opening force from electromagnetic/pneumatic components. Likewise the pincers has reflecting IR sensors and camera, which are put at the lower part of the pincer. The detailed working pattern and process of the pincers are:

1. The manipulator of the object-moving system moves to the preset coordinate, using the camera to shoot towards the food container, the computer recognize the shot image, obtaining the rough coordinate of the food container.
2. Before griping the food container, the manipulator of the object-moving system first moves to the right front of the rough coordinate of the food container that is to be fetched.
3. The forward sensor a, begins to work. First, the mechanical manipulator makes transverse and parallel movement in the motion field. At this moment, though the pincers are not in contact with the food container, the left-right movement changes the distance between the forward sensor a and the food container. As described above, and as shown by 13/14 in FIG. 13., comparing to non-right-against reflection, only when the forward sensor a is right against the food container, the amount of IR reflection is maximum, i.e., the current passing through the IR sensor is maximum. The computer does real-time monitoring for the current in the moving process of the object-moving system, and it records the coordinate of the object-moving system when the current that pass through the sensor reaches maximum/extreme/threshold value, i.e., this sensor is right against the transverse coordinates of the food container. with this coordinate, the relative transverse coordinates between the food container and the object-fetching device can be obtained, then the mechanical manipulator of the object-moving system can be made right against the food container. After the computer has obtained the variation information of the current, the forward sensor a can stop operating.
4. The mechanical manipulator first do transverse and up-down movement in the motion field, then the forward sensor a begins to work; the up-down movement changes the distance between forward sensor a and the food container, and the computer does real-time monitoring for the current in the moving process of the object-moving system, and it records its waveform, and then based on its waveform and the extreme values, the vertical coordinate of the turn-up can be obtained, thus making that the lower end of the pincers of the mechanical manipulator can accurately calculate the positions of the container's turn-up and grooves.
5. After the computer has obtained the variation information of the current, the forward sensor a stops operating. The computer controls the pincers to slowly move forward, at this moment, the upper part of the pincer is opened up. When the turn-up of the food container blocks the signal of the turn-up sensor in the process of moving forward, the computer knows the turn-up coordinate in the forth-back directions, and then, the upper part of the pincer is opened up, powered off and closed down. The mechanical manipulator pinches the turn-up of the food container.
6. Object-fetching motion: the computer controls the pincer to snap into the turn-up & groove of the container, and give a tight pinch. slowly lift it up for a certain distance, make the food container separated off the support of the bottom, then the object-fetching mechanical manipulator retracts. The fetching of the food container finished.

One Specific Example is a Construction that Use Hook-Push Manipulator in Conjunction with Retractable Pallet and Ridgy Plain-Board Product Shelves this hook-push manipulator is actually a horizontally movable noose-like frame (iron ring) with irregular shape. This design reduce a mechanical manipulator—the complicated component, and has lower requirements on the shape of the food containers, and as well stores more foods, but the food containers can only be put in a single layer, no stacking up, therefore it need more layers in the product shelves. And that, this construction is more suitable for flat-shape food containers and is not suitable for high-narrow-shape food containers.

Figure 16:
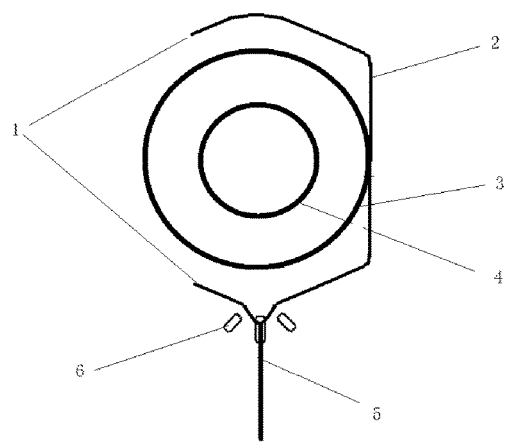
FIG. 16 is the top-view schematic diagram of the structure of the push-hook manipulator

The construction of the push-hook manipulator is as shown in FIG. 16, and is a horizontally movable noose-like frame (iron ring). This hook-push manipulator has a support handle (5) to support the whole hook-push manipulator; there are multiple optical devices (6) in the bottom of the handle, including camera and IR sensors, of which the feedback principle is the same as the similar part described in the above optimum example. A tapered circular food container, which is the common disposable containers, are placed in the middle; the food container has a maximal outer edge (3) and a push-pull outer edge (4) in the lower. It shall be noted that the food container is not limited to round shape, here is for explanation only, what the point is that the above two outer edges are in different sizes. The noose-like frame (2) of the push-pull manipulator is slightly larger than the maximal outer edge (3) of the food container; the small noose-like circle (1) of the push-pull manipulator can match the push-pull outer edge (4) in the lower of the food container. The working principle and procedure of this push-hook manipulator is that: the push-hook manipulator moves over the food container, in the space between the food container and the upper shelf board of the product shelves, then lowers a little, and according to the sensor, get the rough position of the food container first. Then the push-hook manipulator lowers again, make the noose-like frame sink around the flange in the cover of the food container; the diameter of the cover flange is much smaller than the noose-like frame of the push-hook manipulator, therefore, at this moment, the food container is not touched yet. The push-hook manipulator pushes the flange of the cover of the food container towards the moving-out direction. i.e., pushes or pulls the food container and make a little space between the food container and the front adjacent food container, until the space is adequate for the hook-push manipulator to explore in and not to knock down the two adjacent food containers. Then the hook-push manipulator explores into the above mentioned space, and sinks around to the lower part of the food container, pushes and pulls the food container. Since the size of the inner edge of the hook-push manipulator is definite, the position of the pushed-pulled food container can be calculated based on the coordinate of the mechanical manipulator.

Figure 17A:
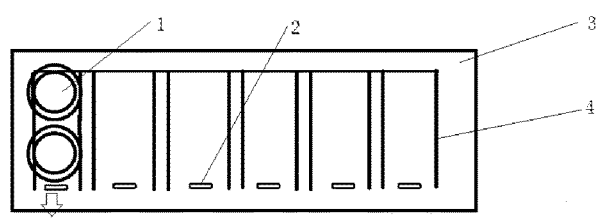
FIG. 17a and FIG. 17b are the top-view of the product shelves board with spacing ridges
Figure 17B:
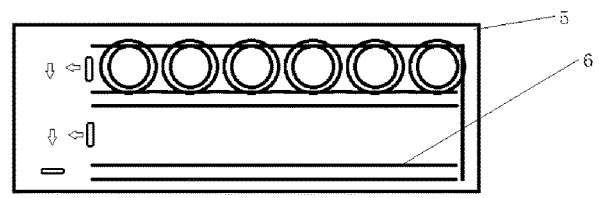

There are in the following two types of shelf boards with spacing ridges in the product shelves, which is working in conjunction with the above described construction. As shown in FIG. 17a and FIG. 17b, the food containers (1) are separated by the spacing ridges (4). The direction of the spacing ridges (4) is parallel to the in-out direction of the food containers; it is to separate the food containers and make the food containers fixed in a single direction; the width is identical to the width of the bottom of the food container. Compared to the outlet there is a bulge (2) on the outlet, i.e. a gradual spacing ridge, to prevent the food container from falling off due to some reasons, and, to make the food container slightly inclined when being moved to this position, which is convenient for the retractable pallet to insert to its bottom.

The spacing ridges of the shelf boards in the product shelves have, apart from the forth-back push-pull structure (3), a structure that push-pull in lying-down L track (5). The structure that push-pull in lying-down L track (5) is provided with transverse spacing ridges.

The retractable pallet is a sheet-like plain shovel, which is under the push-hook manipulator, of which the height is fixed relative to the push-hook manipulator, but it can move forth-back relative to the push-hook manipulator, and its edges in the both sides have forth-back-directed spacing ridges that is identical to the size of the bottom of the food container, for preventing the food container from transversely getting off. It has a degree of small angle inclined to the forth-down direction. In the help of the push-hook manipulator, when the half of the forth part of the food container move passing the bulge (2), it inserts forward into the bottom of the food container, or, takes the food container at the outlet of the product shelves. The function of this is to support the food container. The retractable length of this retractable pallet can be controlled by stepper, servo or AC-synchronous reducing motor.

A Specific Example of Utilizing Pickup Device to Pick Up Serried Stack-Up Container (or Package)

Some food containers are very small, which has lesser food inside; some of them are in flat shape, some can come in large number, some are in irregular shape, some are soft-packaged; when storage replenishing, if they are to be put in one by one, a lot of time will be consumed. For convenient storage replenishing, there is a design as described below.

Figure 18:
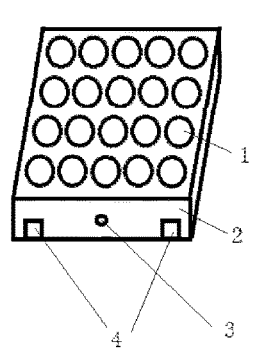
FIG. 18 is the schematic diagram of the drawer-like storing-and-transporting receptacle

As shown in FIG. 18, the containers that used in this construction is a specially-made large drawer-like storing-and-transporting receptacle (2), which contains many single or multiple layers of the small food containers (1); in the bottom or on the bottom surface of the drawer-like storing-and-transporting receptacle (2) there are structures that matches the product shelves, which can be directly placed on the beams of the product shelves without forth-back displacing, and under the help of a locating block on the beam of product shelves there will be no left-right displacing. That is, it can be kept fixed, no easy displacing. There are pits at the bottom of the receptacle, which are used to put small food containers inside, and which match the bottom shape of the small food container. The drawer-like storing-and-transporting receptacle (2) is further provided with a handle (4), which is a cylindrical slot that is open downward and has a conical trumpet-like transition opening, which can make the inverted hook-fork of the mechanical manipulator in the the object-moving system that described below snap in. And there is optical marks (3) for positioning and adjusting the coordinate of the object-moving system.

Figure 19:
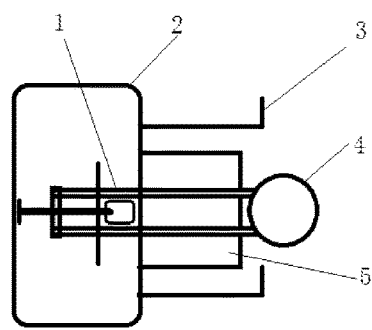
FIG. 19 is the schematic diagram of the hook-fork manipulator

As shown in FIG. 19, the above mentioned drawer-like storing-and-transporting receptacle is to be used in conjunction with a special hook-fork manipulator (2). This hook-fork manipulator has an upward hook-fork (3), which can insert into the handle of drawer-like storing-and-transporting receptacle, and follows the movement of the mechanical system and moves the drawer-like storing-and-transporting receptacle. And there are sheet-like plain shovel (5) and push-pull ring (4). The push-pull ring (4) can be pushed & moved by the mechanical (1), and it can be stretch out of or retract into the area of the sheet-like plain shovel (5). If a container that has a smaller diameter than the push-pull ring is placed on the platform, and the size and coordinate of that container has been known, then the push-pull ring can noose the food container from above when stretching out, and draw the food container in or push it out of the area of the sheet-like plain shovel (5) when retracting in. Since the push-pull ring has a fixed shape, therefore, when the push-pull ring nooses the small food container, by moving the push-pull ring forth-back-left-right, the small food container can be putted in the correct position. Both the bottom of the food container and the sheet-like plain shovel shall have edges of transition bevel, make them convenient for the operations described above.

Figure 20:
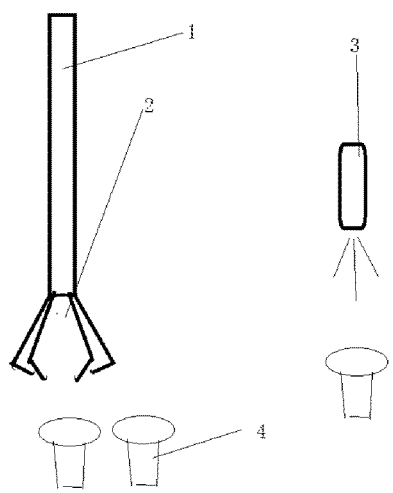
FIG. 20 is the schematic diagram of the pickup device

As shown in FIG. 20, there is also a 4-jaw claw pickup device that is to be used in conjunction with the hook-fork manipulator described above, which can pick up small food containers from drawer-like storing-and-transporting receptacle. The above mentioned hook-fork manipulator fetches the drawer-like storing-and-transporting receptacle and moves the drawer-like storing-and-transporting receptacle under the optical sensor (3), the computer analyzes the optical information and locate the position of one of the small food containers in the drawer-like storing-and-transporting receptacle, then the hook-fork manipulator moves drawer-like storing-and-transporting receptacle, make the small food container to be aligned with the 4-jaw claw pickup device. The 4-jaw claw pickup device has a fixed long stem (l), of which the length make the 4-jaw claw pickup device able to explore into the drawer-like storing-and-transporting receptacle to catch the food containers, and without touching the enclosure of the drawer-like storing-and-transporting receptacle. There are 4 jaws (2) in the lower part of the 4-jaw claw pickup device; the jaws has barbs to hook the turn-up of the food container. After the small food container is aligned correctly, the object-moving system lift up the drawer-like storing-and-transporting receptacle, and then make the 4-jaw claw pickup device explore in to catch the small food container (4). And then the object-moving system lowers, and to put the drawer-like storing-and-transporting receptacle back to the original position. Next, with the help of the sheet-like plain shovel and the push-pull ring as shown in FIG. 19, after the sheet-like plain shovel and the push-pull ring are aligned with the small food container and are lifted up to a level that the small food container is supported, and then, the 4-jaw claw pickup is opened to let the small food container to be completely placed on the sheet-like plain shovel. And then the hook-fork manipulator moves to other devices and hands over the small food container to other devices for processing.

In addition, the pickup device can also adopt a form of negative pressure sucker to pick up foods that is in plain soft package.

Food-processing equipment has many types. Cooking devices can can be used to cook food (for example, microwave heating device, electric baking oven, hot air/steam nozzle, electric heating griddle, food pre-heating device, ultrasonic mixing device, etc.). Mixing-and-processing devices can be used to change the ingredients of food or the structures of food container (cold/hot water injecting device, extruding device of solid condiments/liquid or soft-solid, food container cover-piercing device, food container cover-opening-and-closing device, etc,). Or they could be the combinations of the aforementioned devices.

In the followings, from the aspects of the food-processing equipment, 8 examples of specific examples are used for illustrating, comprising: the cooked-food vending machine, microwave noodles vending machine, fried-thin-pancakes vending machine, fried-and-grilled foods vending machine, inject-processing noodles vending machine, bread foods vending machine, fancy instant-mixing drinks vending machine, fruits-and-vegetables mixing-drinks vending machine.

Cooked-food vending machine, the design and structure is: There are multiple customer fetch windows, and the food-processing equipment comprises multiple microwave equipment, and the food-processing equipment also comprises multiple thermal-and-preheating equipment, and its food-processing equipment also comprises food-container-piercing equipment. Its food container adopts microwave-compatible materials, such as pp plastics, etc. The other structures are identical with the general part of this invention.

The food-container-piercing equipment of the cooked-food vending machine is a straw-size, vertical, stainless piercing-needle tube, or a stainless angle-bar in the same size. Its needle section is at the bottom of the piercing-needle tube, and its needle section is chamfer-shaped and the bottom is sharp enough to pierce the food container. The piercing-needle tube can be installed in a fixed manner, and can also be installed on a downward movable component (like electromagnet). When fixed, the piercing-needle tube can pierce the food container by moving up the food container. When the piercing-needle tube is installed on a movable component, it can pierce the food container by moving down the movable component. Because this food-processing equipment does not produce heat, this equipment does not need casing and auto gate.

The thermal-and-preheating equipment of the cooked-food vending machine is a food-processing equipment that is used for preheating foods or insulating the processed foods. Its outer casing, is the same as other food-processing equipment, comprising insulating casing, auto gate, air loop piping, and its interior has heating components (like resistance wire and heating tube, infrared tube, etc.) and the temperature sensor, which can control the inner air temperature.

The characteristics of the working method of the cooked-food vending machine are: in the process of making and selling foods, when the mechanical manipulator of the object-moving system fetches the food container, the clamp of the mechanical manipulator will first move to the bottom of the piercing equipment, namely, the piercing-needle tube, to make the piercing-needle tube be right against the pit which needs to be pierced and which is in the lid of the food container (the pit is usually in the middle of the lid), and then the mechanical manipulator slowly rises or the piercing-needle tube moves down to make the the piercing-needle tube pierce the food container, and after piercing the food container the mechanical manipulator moves down to detach the container from the piercing-needle tube, and finally the mechanical manipulator retracts to the motion field. After the completion of the above program, the mechanical manipulator hands over the food container to the other equipment for processing and delivering to customers. In this process, in order to save the customers' waiting time, before the rush hour of selling, or when the microwave equipment is working and the mechanical manipulator of the object-moving system stays idle, a certain amount of processed food will be prepared, and the food container will be sent to the thermal-and-preheating equipment and be preheated, and then it is put into the microwave to be heated, and after heating it will be put back into the thermal-and-preheating equipment, and ready to be sold and delivered to customer at any time.

Figure 21:
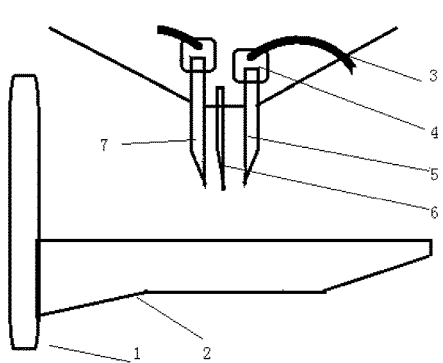
FIG. 21 is the side-view schematic diagram of the liquid injecting food processing equipment

Microwave noodles vending machine, the design and structure is: there are multiple customer fetch windows, and its food-processing equipment comprises cold-hot-water-injecting device as well as the corresponding cold-hot-water insulating pipes, and its food-processing equipment comprises multiple microwave equipment. Its normal-temperature chamber has water-storing system and cold-hot-water-supplying system. And its food container adopts microwave-compatible materials. The other structures are identical with the general part of this invention. Specifically:

[Microwave noodles vending machine], its cold-hot-water injecting device, in which its exterior is similar to other food-processing equipment, is insulating casing that has auto gate and is connected to the air-circulating system. And its inner chamber is as shown in FIG. 21, with an upright tube-shape hot-water injecting device (5), and its bottom is sharp to pierce the food container, and the other end is connected to the hot-water system via insulating piping (3). Inside the insulating pipe, there is heating wires and temperature-measuring devices, which are able to make the liquid in the tunnel not frozen despite long time dwelling in, and retain a certain temperature. The upper end of the hot-water injecting device is also entwined with the heating wires as well as the temperature-measuring device, to avoid the freeze of the liquid inside the injecting device, namely a thermostat (4). When the pump for drinking-water in the hot-water-supply system is power-on and works, the hot water will be injected out from the hot-water injecting device. And the gas-discharging tunnel (6) discharges the waste hot-humid gas. The cold-water injecting device (7) can inject the drinking water inward. The same as the heat-storing-and-hot-air-injecting electric oven equipment of the [fried-and-grilled foods vending machine], it has the structure-similar platform (2) and the elevating device (1), and the working method and effects of the platform are also the same, which can make the injecting device pierce/detach from the food container.

The water-storing and cold-hot-water-supplying system of the microwave noodles vending machine is similar to the common pipe-hot-water-tank system or barreled-water system.

The characteristics of the working method of the microwave noodles vending machine are: for the food within, such as the quick-frozen dry noodles and meat-vegetables, ingredients, etc., the storage temperature is about minus 20 degrees Celsius, and after put into the cold-hot-water injecting device, the injecting device pierces the food container by raising the platform. After injecting a certain amount of close-to-boiling-point hot water, the temperature is balanced at between the storage temperature and the hot-water temperature, and then the platform moves down to detach from the food container, and the mechanical manipulator picks out the food container and puts it into the microwave equipment for heating it to near-boiling point. And finally it is fetched and sold to the customers. Or dwell for a period of time and wait for high-temperature sterilizing from the hot-water, and then inject cold water inward to cool it down to a temperature acceptable for human body before selling to the customers.

Figure 22:
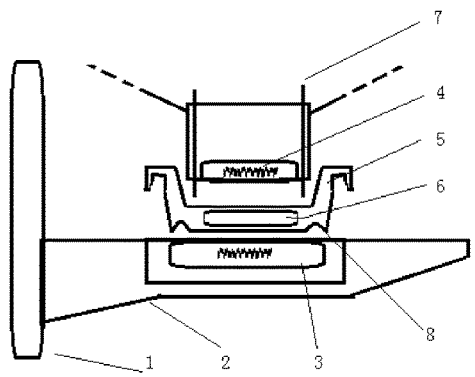
FIG. 22 is the side-view schematic diagram of frying-plates-and-ovens-food-processing equipment

Fried-thin-pancakes vending machine, its characteristics are the shape of its food containers and the structure of the frying-plates-and-ovens-food-processing equipment. As shown in FIG. 22, the shape of the food container (5) applied for thin pancakes (6) is much flatter, and in the middle of its lid, there is a large area (larger than the thin pancakes) of flat pits, and in this way, after the lid is on, the height from the center of the lid to the bottom of the container is just slightly larger than the height of the thin pancakes, and after the thin pancakes are put inside the container, the upper and lower surfaces can tightly adjoin the food container. To match the thin-pancakes food, there is a ring concave-convex groove (8) at the bottom of the food container. The bottom of the food container can also be designed to be arrays of concave-convex pits in round, rectangular, quincuncial or star-like shapes, in order to make foods in shapes other than the thin pancakes. The material of the food container similarly uses materials suitable-for-frying (i.e., aluminum foil with coated layer). The casing of the frying-plates-and-ovens-food-processing equipment is the same as other food-processing equipment, and its inner chamber is the same as the heat-storing-and-hot-air-injecting electric oven equipment of the above microwave noodles vending machine, which has a structure-similar platform (2) and the elevating device (1), and besides the two upper and lower heating plate (4)(3). When processing the foods, the platform rises, and the gas-discharging piercing tube (7) pierces the container in space about the thin pancakes, and the two plates clamps the food container tightly, and the plates are heated, and its heat conducts through the food container to process the thin pancakes. The waste gas produced in the heating process is discharged by the gas-discharging piercing tubes. After the processing is done, the platform moves down to the original position, it is taken out by the mechanical manipulator of the object-moving system. and after that it is handed over to the other equipment for processing.

Fried-and-grilled foods vending machine, in terms of its working principle, is also called injecting-hot-air-fried foods vending machine. Its design structures are: there are multiple customer fetch windows, and its food-processing equipment comprises multiple electric oven equipment, and its food-processing equipment also comprises multiple thermal-and-preheating devices. Its electric oven devices adopts the heat-storing-and-hot-air-injecting electric oven that specially designed for this machine. Its food container adopts the barbecuing-compatible material, like aluminum foil, etc. The other structures are identical with the general part of this invention.

Figure 23:
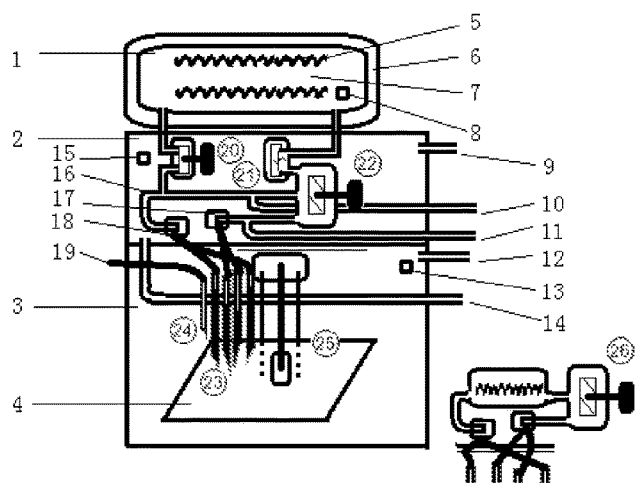
FIG. 23 is the schematic diagram of the heat-storing-and-hot-air-injecting electric oven equipment

The heat-storing-and-hot-air-injecting electric oven equipment of the fried-and-grilled foods vending machine, its casing is the same as other food-processing equipment, and comprises the insulating casing, the auto gate, air-circulating piping, and its inner chamber comprises the platform with the elevating device and the upper hot-air injecting device (as shown in FIG. 23, 1. heating-and-heat-storing device 2. hot-air driving device 3. food injecting and processing region 4. movable platform 5. heating components 6. high-temperature-resistant insulating layer 7. heat-storing material and air passage 8. temperature-measuring sensor in the heating-and-heat-storing region 9. external air inlet for devices heat discharging 10. external air inlet and valve for cooking 11. external air inlet and valve for cooking 12. air outlet in the food-processing region 13. temperature-measuring sensor in the food-processing region 14. external air outlet for device heat discharging 15. temperature-measuring sensor in the equipment chamber 16. high-temperature-resistant insulating pipes 17. air-injecting temperature-measuring sensor, air-injecting valve 18. air-suction temperature-measuring sensor, air-suction valves 19. hot-water pipes 20. active valves 21. passive valves 22. main air pump 23. hot-air injecting tubes 24. hot-water injecting device 25. platform-elevating device 26. simplified structures). The heat-storing-and-hot-air-injecting electric oven equipment can also be replaced by two sets of food-processing equipment (the container-lid-opening-closing equipment and electric oven equipment), but the heat-storing-and-hot-air-injecting electric oven equipment is the best solution to achieve this function, and its structures and working methods specifically:

when the auto gate of the equipment is opened, before and after the cooking by this equipment, which is when the food processing is about to start or already ends, the movable platform moves down to the bottom, the mechanic manipulator of the object-moving system accurately places the food container onto the platform, or takes away the food container from the platform.

The hot-air injecting device comprises the heating-and-heat-storing device (1) and the hot-air driving system (2) and the food-injecting-processing region (3), and the hot-air injecting tube (23) comprise a multi-concentric tube or several hollow tubes, which is sharp at the lower parts. The equipment uses this component to pierce the food container. The circulating hot air is via this component injected into the food container, and is also via this component discharged out of the food container, and its upper part is connected to the hot-air driving system via air-injecting/air-suction temperature-measuring sensor (17)(18), and is able to monitor and measure the temperature of the hot air, which is going through or injected into the food container.

The hot-air driving device comprises the active valve (20) and the passive valve (21) and the main air pump (22) and the high-temperature-resistant insulating pipes (16), which connected to the heating-and-heat-storing devices. The main air pump provides driving force for the circulating hot air and makes the cold and hot air in the two tunnels (heating and heat-storing area and the food container area) fully mixed. The active valves are the devices that drive the valves by current for opening and closing, and the passive valves are the devices that drive the valves passively only by in-out air press for opening and closing, and in terms of the functions, the active valves can replace the passive valves. By controlling the opening-and-closing scale of the active valves, the system controls the flow of the hot air going through the heating-and-heat-storing device.

The heating-and-heat-storing device comprises the heating components (5), the high-temperature-resistant insulating layer (6), the heat-storing material and air passage (7) and the heating-and-heat-storing region temperature-measuring sensor (8). The temperature-measuring sensor measures the temperature of the air, and the computer can control the heating power of the heating component, so as to make the temperature controlled within a certain range (higher than the food-processing temperature), and the heat-storing material has the function of storing heat and keeping the air temperature stable. In this way the oven can produce relatively high and instantaneous power for food processing, and retain a relatively stable total-power input. The high-temperature-resistant insulating layer comprises different multilayer high-temperature-resistant-and-insulating materials, which can well isolate the internal high-temperature components, and its inner heat is taken out via incoming air.

The platform-elevating system comprises: the movable platform (4), the platform-elevating device (25), which are used to cause the food container and the hot-air injecting equipment to make accurate relative movements so that the hot-air injecting equipment can pierce or detach from container. Its alternative can be that the platform is static, the hot-air injecting device is moved to pierce or detach from the food container.

The heat-discharging system: in order to make devices such as various main air pumps etc. work properly, the external air comes in from the external air inlet for devices heat discharging (9) and is discharged from the external air outlet for device heat discharging (14), taking away the heat produced while the equipment is working and keeping the temperature below room temperature. The other ends of the piping of the external air outlet(s) and inlet(s) are both in normal-temperature chamber, with air blowers and valves respectively. The air blowers keep working and the valves keep open to sustain the heat-discharging air flow, until all kinds of equipment stop working and the temperature is detected below room temperature by the temperature-measuring sensor in the equipment chamber (15).

The air outlet in the food-processing region (12), when the auto gate of the food-processing equipment is about to open or is slightly opened, the air-circulating system will discharge the hot air in the processing region, and the auto gate will not be fully opened, until the temperature-measuring sensor in the food-processing region (13) detects that the temperature is approaching stability, and at this time the humid-and-hot air are basically discharged.

The regulating and controlling of the temperature inside the food container: when the computer detects that the temperature of the hot air going through the food container is too low, the computer will control to increase the air flow that pass the heating-and-heat-storing device, so as to raise the temperature of the air injecting to the food container. When the computer detects that the temperature of the hot air going through the food container is too high, it will decrease the air flow that pass the heating-and-heat-storing device. When there is a need to rapidly and drastically decrease the temperature inside the food container (for instance, when the food processing is finished and there is a need to cool it down), the computer can open the external air inlet and valve for cooking (10) and the external air inlet and valve for cooking (11), and the valves or air pumps in the other ends of these two passages will open, and at this time the residual hot air/heat inside the food container and the air passages will be exchanged with the external air and discharged via the external air outlet for cooking, so that the interior of the food container is cooled down rapidly.

The clean-and-maintenance methods, as stated above the food-processing hot air contains oil-gas, and the oil-gas will not be deposited, because the high-temperature-resistant insulating pipes (16) has a relatively high temperature. When the oil-gas enters the pipe of the external air outlet for cooking (11), the temperature of the oil-gas gradually decreases, and at this time the oil-gas will be condensed inside the pipe. Therefore, in order to solve this issue, it's necessary to regularly conduct operations of discharging oil-gas in the pipe. Inside the high-temperature-resistant insulating layers of the pipe, there are temperature-controlling devices, that is, outside the metal pipe, heating wires/electric-heating devices as well as temperature sensors (or overheat protector), are wrapped. When the heating wires are heating, at set intervals, the computer will check the changes of the temperature via the temperature sensors, and when the temperature reaches the preset value, the heating wires stop heating, so as to make sure the temperature is under control and in safety. The heating wires while heating make the temperature inside the pipe slightly higher than the processing temperature, and the oil-gas that is originally condensed on the walls of the metal pipe, will be evaporated, and at this time the temperature of the wall of the metal pipe is relatively high, so the oil-gas will not be attached on the wall of the pipe. When discharging the oil-gas, the air-injecting valves (17) and air-suction valves (18) of the hot-air-injecting tubes are closed, and the valves of the external air inlet for cooking (10) and the valves of the external air outlet for cooking (11) are opened, and the main air pump (22) are working for ventilation and discharging the oil-gas. At this time because the temperature inside the pipes of the external air outlet for cooking (11) is relatively high, the deposited oil-gas inside the pipes is evaporated and discharged. The exit of the pipe of the external air outlet for cooking (11), which is connected to external space, should also have joint(s) that is connected to the replaceable oil-waste container, the outdoors air-discharging piping or oil-smoke purifier, which are outside the vending machine, so that the condensed oil-gas will not be emitted impacting other equipment.

The safety considerations: It's necessary to consider the overheating conditions that might occur in the event of error by electromagnetic interference, or using the food container made from wrong materials, or program bugs, or sudden power failure, or mechanical accidents. The solutions are, that all the valves connected to the heating-and-heat-storing devices (1) adopt the design of automatic reset, that is, in event of power failure, the valves will automatically be closed. If the used containers are made from uniform materials, which have uniform melting point, then simply add a thermo-switch in the location, the upper part of the hot-air injecting tubes (23) that pass the air-injecting/air-suction temperature sensor (17)(18), and in event of overheating it will shut down the current, and notify the control computer. If the used containers has various materials and correspondingly many melting points, then apart from the above solution to control the maximum safety temperature, still it's necessary to set two sets of independent temperature-measuring-controlling system, which can independently receive the serial data commands of the control computer. When the commands are received, the system will open the current switch for a very short period of time, and re-receive the serial data commands of the control computer, and once it does not receive new commands, the current will be cut off. And in this system the temperature sensors and the current switches are independent. Two systems, if either system cuts off the current, the equipment will stop working. Therefore it avoids that the food container is melted by wrong operations of the equipment because of some unpredictable causes. Besides, in order to solve the issue that the operators mistake the plastics container for the metal container, and send wrong commands to the vending machine, and as a result conduct some in-temperature-inappropriate processing for the plastics container; and it's also to avoid that the food container is not put in, the machine make operations and processing mistakenly. In this case sensor(s) that judge if there is a food container (for example, infrared sensors and capacitive proximity sensors) and sensor(s) that judge if it is metallic (for example, eddy-current proximity sensors), may be put in the middle of the movable platform (4).

There are two methods to adjust the internal humidity of the food container:
1. Before the food container is put inside the vending machine, do regulating by controlling the moisture inside the food container or the moisture in the food surface. For example, to spray moisture on the surface of the quick-frozen food to make it condensed to ice layers on the food surface or the interior surface of the container so as to increase the humidity of the air when cooking.
2. Use the hot-water injecting device (24) to blast a certain amount of close-to-boiling-point hot water into the container, and when the hot water contacts the cooking hot air, the humidity can be adjusted. The hot-water injecting device, apart from being the accessory device of this equipment, may also be an independent device, which means that the two processes of adding hot water and injecting hot air, can be implemented separately in two sets of independent devices, and can also be implemented at the same time.

Low-cost-and-simplified structures (26), do not have the heat-storing function, and its internal air passage only comprises the insulating layer, air blowers, heating chamber, temperature sensor, pipes and injecting tubes. It is applicable to occasions where there is no limitation on power or no need to start simultaneously multiple high-power devices.

The fried-and-grilled food vending machine, its characteristics of the working methods are that: in the process of making and selling foods, when the mechanical manipulator of the object-moving system fetches the food container, the clamps of the mechanical manipulator will first put the food container onto the platform of the heat-storing-and-hot-air-injecting electric oven equipment, and make the food container be right against the piercing tube of the injecting device. At this time, the main air blower will start and work for a short-time, to discharge the residual waste gas deposited in the pipe. And the platform gradually rises to make the piercing needle tube pierce the food container, and then the equipment will inject temperature-controlled hot air into the food container, so as to bake or fry the foods inside the container. When frying, increase the air-circulating speed and the heating extent on the surface of the food, so that the oil-coating surface of the foods can sustain a short-time high temperature and achieve the frying effects. When the cooking is finished, the platform goes down to its original position, and the mechanical manipulator takes out the food container and hands it over to other equipment for processing, and it's delivered to customers. In this process, in order to save the customers' waiting time, before the rush hour of selling, or when the microwave equipment is working and the mechanical manipulator of the object-moving system stays idle, a certain amount of processed food will be prepared, and the food container will be sent to the thermal-and-preheating equipment and to be preheated, and then it is put into the heat-storing-and-hot-air-injecting electric oven equipment to be heated, and after heating it will be put back into the thermal-and-preheating equipment, and ready to be sold and delivered to customer at any time.

If the fried-and-grilled foods vending machine does not use the barbecuing function, it can also use the food containers that are made from materials with relatively low melting point. For example, foods like rice, noodles, vegetables, etc., need only heating from the hot air that is slightly higher than the boiling point of water.

Figure 24:
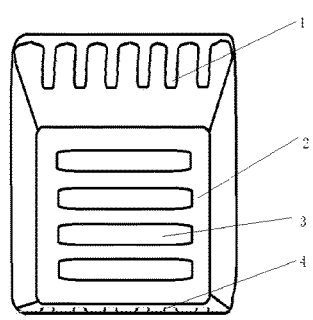
FIG. 24 is the top-view of the food container applicable to the hot air injecting processing

In order for the hot air to fully contact the foods, the placements of the foods and the food container can use the method that is similar to making skewered foods in the common rotating oven, suspending the foods, and cut the foods to slices or strips, so that it can greatly reduce the heating time of food. For the above purpose, a new structure of food container, seen slope upward from the bottom of the food container, is shown as FIG. 24, and at the opposite sides of the food container there are slots (1) that put bamboo skewers, and the skewers of the skewer foods, which is made of bamboo or other material, are stuck on the corresponding slots (1) of the food container, so when the food is being processed, the processing time can be shortened. The bottom of the food container (2), has the ventilated grooves (3) on there, and the direction of the ventilated grooves is consistent with the direction of the air flow from the hot-air injecting tube. The ventilated grooves can be used for thin-pancake-type foods, so that the bottom of the thin-pancake-type foods, can also receive hot air.

The inject-processing noodles vending machine, its structures and functions and working methods are basically identical with the fried-and-grilled foods vending machine, but it's different in the ingredients of the foods and the processes of food-processing. The method of microwave vending machine is to first inject hot water and then heating, and here it's first heating until the cooking process is finished, and then injects hot water, and make delivering to the customers. In this way the last-injected hot water will not need to be heated to reach the close-to-boiling-point temperature, for example, pure and clean warm water of at around 60 degree Celsius can be injected inside. This method can save the time and electricity of food processing. This method can also make the temperature of the food container not so high that when it is being sold the customers can not pick up. The noodles in this vending machine are relatively suitable for wet noodle tangles with moisture.

The bread foods vending machine, its structures and functions and working methods are basically identical with the fried-and-grilled foods vending machine, but it's different in the ingredients of the foods and the processes of food-processing. Because the bread is the porous-shaped, with-little-moisture, and low-heat-conductivity foods, which has a relatively long time of heating. If the bread foods need to be delivered to the customers quickly, it's necessary to shorten the time within the oven, and apart from pre-baking or half-baking before entering the vending machine, it's also necessary to within the vending machine, have longer preheating time or prepare more heating-finished products before sales. In this way the bread foods vending machine needs more thermal-and-preheating equipment.

The fancy instant-mixing drinks vending machine, compared with the microwave noodles vending machine, besides the differences in sizes and shapes of the mechanical clamps and the food containers, and the differences in the types of the foods, it has a drinks-fancy-drawing-food-processing equipment which is used for the fancy drawing on the surfaces of the drinks, and a food-processing equipment that is used for injecting mixed pulp materials, and these two devices partially share the common structures: the tube-piercing-powder-conveyor system that is used to extract powder from the disposable container.

Figure 25:
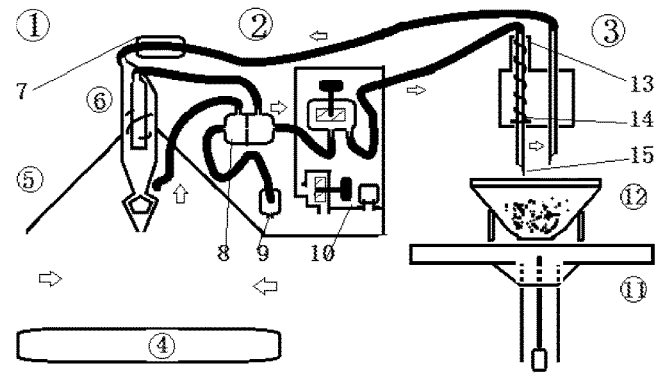
FIG. 25 is the front-view of the tube-piercing powder-conveyor system

The tube-piercing powder-conveyor system, as shown in FIG. 25, the system has three parts: 1. the powder-releasing part 2. the powder-conveyor part 3. the powder-collecting part. After the disposable container is pierced, the powder in the disposable container will follow the air flow, from the powder-collecting part, going through the powder-conveyor part, conveyed to the powder-releasing part, and finally released. The whole process is conducted in low temperature (the temperature of the low-temperature chamber).

The powder-releasing part comprises waste-material-storing device (4), gas-collecting hood (5), gas-solid separator (6). When the circulating air flow moves the powder into the gas-solid separator, the powder will be released from the lower end of the gas-solid separator, and the food container etc. will be right beneath (above the waste-storing device) it to receive powder. And the waste-storing device receives the waste powder that drops. The gas-collecting hood is used to collect the humid-and-hot air produced from the food container etc.

The powder-conveyor part comprises the infrared-powder-monitoring device (7), air flow distributor (8), external air outlets (9), air blower (10) and piping. When the infrared powder-monitoring device detects that the powder inside the pipe runs out, which means that the current of its infrared sensor is lower than a certain threshold value, the computer will receive a powder-running-out signal. There is a deflector hole on the partition board inside the air distributor, which is used for adjusting the air flow of the two air inlets of the airflow distributor, so that the powder can be released with a small air flow via the powder outlets in the lower end of the gas-solid separator. The external air outlets are the same as other food-processing equipment and are used to discharge the wet-and-hot air. The air blower is used to produce air flow, and when the power of the air blower is relatively high, heat-discharging device(s), normal-temperature pipe(s) connected to the exterior, and insulating casing can be provided.

The powder-collecting part comprises 11. The elevating platform 12. The taper-shape food container 13. The spring fixed end 14. The spring tube-press end 15. The air-in-and-out tubes. The elevating platform elevate the food container that is put on it until the food container is pierced by the air-in-and-out tubes. In the air-in-and-out tubes, the left air-in tube has spring structures, and the role of the spring here is to make the air-in tube always pressed on the surface of the pile of the powder inside the taper-shaped food container, and with the conveying of powder, the surface of the pile of the powder is gradually lowered, and the air-in tube pressed lower and lower; and on the right side, the air flow out here, the air-out tube, carrying the powder, and the air-out tube does not have a spring, and its length is a little shorter. The fixed end of the spring of the air-in tube makes the air-in tube able to finally pierce the food container, and the spring tube-press end of the spring constrains the air-in tube from popping out by the spring. And the food container adopts the taper-shaped design, so that the unused powder will finally deposit at the bottom of the taper-shaped container. But the bottom of the taper shape is not easy for placement, so there needs to be supporting structures in the outside of the container which is convenient for placement.

Figure 26:
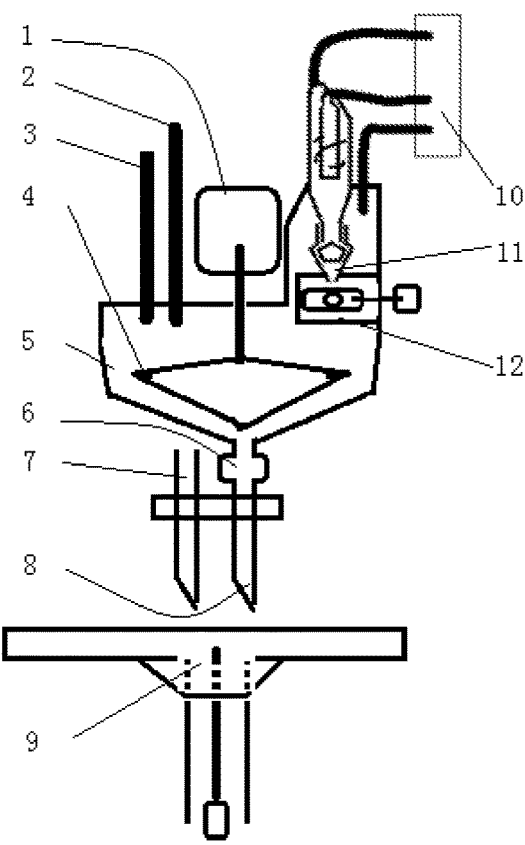
FIG. 26 is the front-view of the mixed-pulp-material-injecting-and-food-processing equipment

The mixed-pulp-material-injecting-and-food-processing equipment for injecting mixed pulp materials, its exterior is similar to other food-processing equipment, and has an insulating casing that has auto gate and is connected to the air-circulating system. Its inner chamber is shown in FIG. 26, and its piercing-tube-powder-conveyor system (10), this part is identical with the above, and when it's working the powder valve (12) will be open, and the powder will be released from the air-solid separating device (11), and when the powder is completely released, the valve will be closed in order to prevent the lower liquid and steam from entering. When the powder is released, the cold-water tube (2) and the hot-water tube (3) will inject cold water or hot water. At this time the motor (1) will start to set the agitating device (4) in motion to agitate and make the raw material in the agitating chamber (5) fully mixed. In this process the main valve (6) is closed. When the platform (9) rises, it makes the injecting tube (8) and gas-discharging tube (7) pierce the food container, and then the main valve (6) is opened, and release the mixed liquid, and at the same time the gas within the container is discharged via the gas-discharging tube. When the mixed liquid is completely released, the drinking water will be injected, and agitated, cleaning the agitating container. The clean liquid can be used as diluting ingredients for the drinks and also can be discharged as waste liquid.

Figure 27:
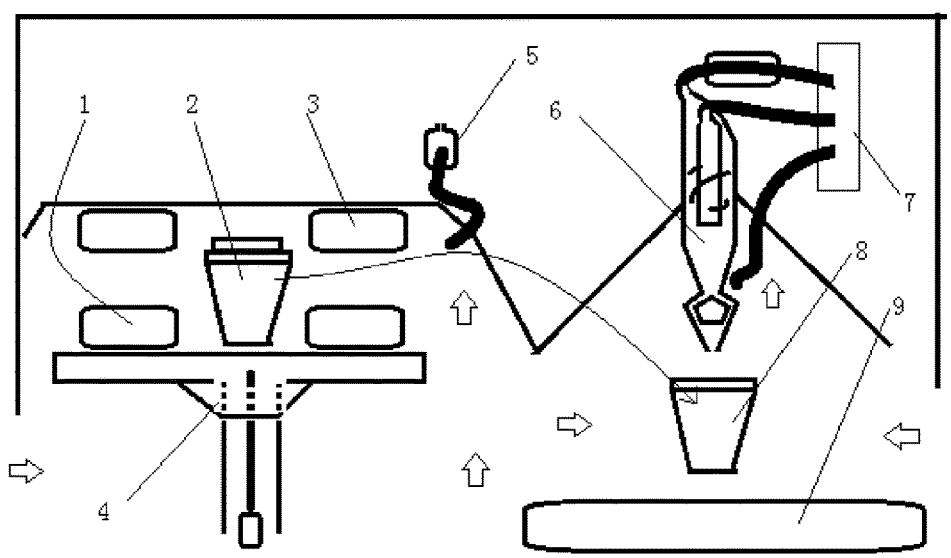
FIG. 27 is the front-view of the drinks-fancy-drawing-food-processing equipment

The drinks-fancy-drawing-food-processing equipment, its exterior is similar to other food-processing equipment and has an insulating casing that has auto gate and is connected to the air-circulating system. Its inner chamber is shown in FIG. 27, specifically:

1. Put the food container (2) on the middle of the up-down movable platform (4)
2. The lower clamp (1) of the lid-opening-and-closing device clamps the food container (2), and the two match with each other in shapes
3. The platform (4) rises to make the flange of the transparent lid of the food container (2), at the same height as the upper clamp (3) of the lid-opening-and-closing device
4. The upper clamp (3) clamps the flange of the transparent lid of the food container (2), and the two match with each other in shapes
5. The platform (4) lowers to the original height, and the transparent lid is separated from the food container 6. The mechanical manipulator of the object-moving system fetches the lid-opened food container
7. The mechanical manipulator of the object-moving system moves the lid-opened food container to be under the solid-gas separating device (6) of the powder-conveyor system (7)
8. The powder-conveyor system starts to work, and the plane-displacement system adopted is the mechanical manipulator of the object-moving system, and the mechanical manipulator of the object-moving system makes the corresponding movement according to the drawing. The powder will draw patterns on the milk bubbles in the food container (8), among which a small amount of waste powder will be scattered into the dust-collecting tank (9).
9. After the drawing is finished, the mechanical manipulator of the object-moving system will re-put the food container on the middle of the platform (4)
10. The lower clip (1) clamps the food container (2)
11. The platform (4) rises to make the food container closed with the lid separated.
12. The upper clamp (3) releases, and the platform goes down to the original height
13. The manipulator of the object-moving system gets the food container, and then hands it over for other equipment for processing.
14. Finally, the customers can see the pattern drawn on, through the transparent lid of the food container During the whole process, because the liquid inside the food container might be hot, then the hot-and-humid air is discharged via the gas-discharging outlet (5) which is connected to the air-circulating system.

The fancy instant-mixing drinks vending machine, its working method is that, the drinks-fancy-drawing-food-processing equipment and the mixed-pulp-material-injecting-and-food-processing equipment are both based on the tube-piercing powder-conveyor system, and the mechanical manipulator of the object-moving system puts the food container inside the mixed-pulp-material-injecting-and-food-processing equipment, injecting proper amount of pulp to be mixed with the food materials which is already there in the food container, and then hands over the food container to the drinks-fancy-drawings-food-processing equipment, drawing fancy patterns on the surfaces of the foods. Finally the foods are delivered to the customers.

The fruits-and-vegetables mixing-drinks vending machine, its structures and functions are completely the same as the microwave noodles vending machine, but the clamps of the mechanical manipulator and the container are different in their sizes and shapes, and also the types of the foods. Inside the food container there are all kinds of quick-frozen chopped vegetables and fruits, juice ice, fruit jams and instant seasoning. The processing procedure: after injecting hot water, put into the microwave equipment for heating to a certain temperature or heating for a period of time or not use the microwave equipment at all (the foods in this type of vending machine, belongs to a category in which it can be eaten directly without any processing, and if processing needed, it's also necessary to use microwave to heat it to a close-to-boiling-point temperature.), and then inject cold water to cool it down, and finally it is delivered to the customer.

Below are other specific examples considering the overall structure:

The food-storage processing machine is basically identical with other general vending machines or vending machines in the specific examples described in this invention, but it uses manual money collection to replace the machine money collection, so it is suitable to be used in supermarkets or convenient stores. It can save the cost of the bill acceptor equipment.

The dinnerware, seasonings automatic-distributing vending machine is basically identical with other general vending machines or vending machines in the specific examples described in this invention, but it installs a out-coming structures in the normal-temperature chamber for dinnerware bags and seasoning bags, so that it's more convenient for the customers to enjoy the food.

The invention claimed is:

1. A food-automatic-cook-and-processing system, comprising:
    an object-moving system;
    a food-processing equipment;
    a food container;
    said food-processing equipment has piercing food-processing device;
    said piercing food-processing device having one or more tunnel(s);
    the end(s) of said tunnel(s) piercing the food container, or being drawn out from the food container;
    the food container is a closed food container;
    the food container has a fixed shape to support piercing operation;
    said object-moving system having structures for moving the food container;
    said piercing food-processing device having adjusting device(s);
    said adjusting device(s) adjusting the volume, velocity or temperature of a media that going through said tunnel(s);
    the media going through said tunnel(s) and going past the food container; and
    the media being made circulating in a closed loop between the food container and said adjusting device(s).

2. The system according to claim 1, wherein:
    the media is hot air;
    having air driving device(s) and air heating device(s) in said adjusting device(s);
    the hot air being heated in said air heating device;
    the hot air being driven moving in said air driving device(s);
    the hot air simultaneously being blowing into and sucking out of the food containers;
    the hot air heating the food inside the food container.

3. The system according to claim 2, wherein:
    said adjusting device(s) has air passages connected to the external air;
    said adjusting device(s) has valves to switch the routing of the hot air flowing in a closed loop or connecting to external air;
    while in a closed loop, the hot air is flowing in an enclosed space;
    while connecting to external air, the hot air inside the food container is discharged through the air passages, and the external cold air going inside the food container, cooling down the food.

4. The system according to claim 3, wherein:

said air passages connected to external space that discharges hot air, has a structure that remove oil-smoke through heating, comprising an insulation layer and a temperature-controlling device;

the insulation layer wraps said air passages;

the temperature-controlling device comprises electric heating wire(s) and temperature sensor;

said air passages connected to external space that discharges hot air are heated by said electric heating wire(s), after the temperature of the air passages risen, the oilsmoke is evaporated or failing to condense.

5. The system according to claim 2, wherein:

having a heat-storing device;

the heat-storing device have heat-storing material inside for storing heat;

the air passage of the heat-storing device being connected to the main air loop passage;

the air passage of the heat-storing device have air valve(s);

the air valve(s) adjusting the velocity or the flow of the hot air going through the heat-storing material inside the heat-storing device;

the hot air going through the heat-storing device is making heat transmission with the heat-storing material.

6. The system according to claim 2, wherein:

the food container is the food container to-be-processed;

having another food container as-food-material-source;

having piercing powder-conveying-allocating structure(s), which simultaneously piercing the food container to-be-processed and pierce another food container as-food-material-source, and establishing airflow passage between the inner chamber of the food container to-be-processed and the food container as-food-material-source;

said piercing powder-conveying-allocating structure(s) creating and utilizing the high-speed circulating airflow to suck the powder food material inside the food container as-food-material-source;

having gas-solid separating equipment above the food container to-be-processed;

after going through the gas-solid separating equipment, the powder food material will be released into the food container to-be-processed.

7. The system according to claim 2, wherein:

said food-processing equipment has a platform for placing the food container;

the section where said platform placing the food container, having a heating plate;

the heating plate transmitting heat through the package of the food container, and processing the food inside the food container by heat transmission.

8. The system according to claim 2, wherein:

the food container used for hot-air inject-processing has slot structures in the sidewall of the food container;

having shaft(s) with food skewered inside the food container;

the end of shaft(s) is supported and suspended by said slot structures.

9. The system according to claim 2, wherein:

the upper end of said tunnel connected to a agitating chamber;

the agitating chamber having a agitating device inside;

the agitating device mixing food materials that to be released into the food container.

10. The system according to claim 1, wherein:

having an elevating device;

the elevating device is capable of changing the relative upward-and-downward distance between the food container and said tunnel(s).

* * * * *